(12) United States Patent
Siman

(10) Patent No.: US 9,128,728 B2
(45) Date of Patent: Sep. 8, 2015

(54) LOCATING SECURITY VULNERABILITIES IN SOURCE CODE

(71) Applicant: Checkmarx Ltd., Tel Aviv (IL)

(72) Inventor: Maty Siman, Tel Aviv (IL)

(73) Assignee: CHECKMARX LTD., Tel Aviv (IL)

( * ) Notice: Subject to any disclaimer, the term of this patent is extended or adjusted under 35 U.S.C. 154(b) by 0 days.

(21) Appl. No.: 13/772,377

(22) Filed: Feb. 21, 2013

(65) Prior Publication Data

US 2013/0167241 A1    Jun. 27, 2013

Related U.S. Application Data

(63) Continuation of application No. 12/443,824, filed as application No. PCT/IL2007/001233 on Oct. 15, 2007.

(60) Provisional application No. 60/853,349, filed on Oct. 19, 2006.

(51) Int. Cl.
*G06F 21/57*    (2013.01)
*G06F 9/45*    (2006.01)

(52) U.S. Cl.
CPC ............. *G06F 8/433* (2013.01); *G06F 21/577* (2013.01)

(58) Field of Classification Search
None
See application file for complete search history.

(56) References Cited

U.S. PATENT DOCUMENTS

| | | | |
|---|---|---|---|
| 5,107,418 A | 4/1992 | Cramer et al. | |
| 5,485,616 A | 1/1996 | Burke et al. | |
| 5,586,328 A | 12/1996 | Caron et al. | |
| 5,586,330 A | 12/1996 | Knudsen et al. | |
| 5,701,489 A * | 12/1997 | Bates et al. | 717/157 |
| 5,742,811 A | 4/1998 | Agrawal et al. | |
| 5,778,233 A | 7/1998 | Besaw et al. | |
| 5,790,858 A | 8/1998 | Vogel | |
| 5,875,334 A | 2/1999 | Chow et al. | |
| 5,881,290 A | 3/1999 | Ansari et al. | |
| 5,978,588 A | 11/1999 | Wallace | |
| 6,442,748 B1 | 8/2002 | Bowman-Amuah | |
| 7,210,133 B2 | 4/2007 | Souloglou et al. | |
| 7,284,274 B1 | 10/2007 | Walls et al. | |
| 7,363,616 B2 | 4/2008 | Kalyanaraman | |

(Continued)

FOREIGN PATENT DOCUMENTS

| | | |
|---|---|---|
| CA | 2200812 A1 | 9/1998 |
| JP | 2003050722 A | 2/2003 |

(Continued)

OTHER PUBLICATIONS

International Application PCT/IL2007/001233 Search Report dated Aug. 27, 2008.

(Continued)

*Primary Examiner* — Jung Kim
*Assistant Examiner* — Adrian Stoica
(74) *Attorney, Agent, or Firm* — D. Kligler I.P. Services Ltd.

(57) ABSTRACT

A tool (22) automatically analyzes application source code (16) for application level vulnerabilities. The tool integrates seamlessly into the software development process, so vulnerabilities are found early in the software development life cycle, when removing the defects is far cheaper than in the post-production phase. Operation of the tool is based on static analysis, but makes use of a variety of techniques, for example methods of dealing with obfuscated code.

15 Claims, 18 Drawing Sheets

(56) References Cited

U.S. PATENT DOCUMENTS

| | | | |
|---|---|---|---|
| 7,392,545 | B1 | 6/2008 | Weber et al. |
| 7,447,666 | B2 | 11/2008 | Wang |
| 7,565,631 | B1 | 7/2009 | Banerjee et al. |
| 7,860,842 | B2 | 12/2010 | Bronnikov et al. |
| 7,971,193 | B2 * | 6/2011 | Li et al. .................. 717/133 |
| 8,510,237 | B2 | 8/2013 | Cascaval et al. |
| 8,949,271 | B2 | 2/2015 | Kocher et al. |
| 2002/0178281 | A1 | 11/2002 | Aizenbud-Reshef et al. |
| 2003/0056192 | A1 | 3/2003 | Burgess |
| 2004/0255277 | A1 | 12/2004 | Berg et al. |
| 2005/0015752 | A1 | 1/2005 | Alpern et al. |
| 2005/0198626 | A1 * | 9/2005 | Kielstra et al. .................. 717/156 |
| 2005/0204344 | A1 | 9/2005 | Shinomi |
| 2005/0273861 | A1 | 12/2005 | Chess et al. |
| 2006/0070048 | A1 | 3/2006 | Li et al. |
| 2006/0085156 | A1 * | 4/2006 | Kolawa et al. .................. 702/119 |
| 2006/0085858 | A1 | 4/2006 | Noel et al. |
| 2006/0253841 | A1 | 11/2006 | Rioux |
| 2006/0282453 | A1 | 12/2006 | Tjong et al. |
| 2007/0006170 | A1 * | 1/2007 | Hasse et al. .................. 717/131 |
| 2007/0083933 | A1 * | 4/2007 | Venkatapathy et al. ......... 726/25 |
| 2007/0143759 | A1 | 6/2007 | Ozgur et al. |
| 2007/0294281 | A1 | 12/2007 | Ward et al. |
| 2009/0187992 | A1 | 7/2009 | Poston |
| 2009/0254572 | A1 | 10/2009 | Redlich et al. |
| 2010/0011441 | A1 | 1/2010 | Christodorescu et al. |
| 2010/0043072 | A1 | 2/2010 | Rothwell |
| 2010/0050260 | A1 | 2/2010 | Nakakoji et al. |
| 2010/0083240 | A1 | 4/2010 | Siman |
| 2010/0088770 | A1 | 4/2010 | Yerushalmi et al. |
| 2010/0229239 | A1 | 9/2010 | Rozenberg et al. |
| 2010/0251210 | A1 | 9/2010 | Amaral et al. |
| 2010/0279708 | A1 | 11/2010 | Lidsrom et al. |
| 2011/0004631 | A1 | 1/2011 | Inokuchi et al. |
| 2012/0240185 | A1 | 9/2012 | Kapoor et al. |

FOREIGN PATENT DOCUMENTS

| | | |
|---|---|---|
| WO | 2005121953 A | 12/2005 |
| WO | 2012/025865 A1 | 3/2012 |

OTHER PUBLICATIONS

Sreedhar et al., "A New Framework for Elimination-Based Data Flow Analysis Using DJ Graphs", ACM Transactions on Programming Languages and Systems, vol. 20, No. 2, pp. 368-407, Mar. 1998.

Helmer et al., "A Software Fault Tree Approach to Requirements Analysis of an Intrusion Detection System", 1st Symposium on Requirements Engineering for Information Security, Indianapolis, Indiana, USA, Mar. 5-6, 2001.

Redgate, ".NET Reflector: Explore, Browse, and Analyze .NET assemblies", 2009 (www.red-gate.com/productors/reflector).

European Patent Application # 07827207.7 Search Report dated Sep. 29, 2011.

Srikant et al., "Mining Sequential Patterns: Generalizations and Performance Improvements", EDBT '96 Proceedings of the 5th International Conference on Extending Database Technology: Advances in Database Technology, pp. 3-17, Avignon, France, Mar. 25-29, 1996.

Zaki, M., "SPADE: An Efficient Algorithm for Mining Frequent Sequences", Machine Learning, vol. 42, pp. 31-60, year 2001.

Pei et al., in "Mining Sequential Patterns by Pattern-Growth: The PrefixSpan Approach," IEEE Transactions on Knowledge and Data Engineering, vol. 16, No. 10, pp. 1424-1440, Oct. 2004.

Martin et al., "Finding Application Errors and Security Flaws Using PQL: a Program Query Language", OOPSLA'05, pp. 365-383, San Diego, USA, Oct. 16-20, 2005.

Yang et al., "Effective Sequential Pattern Mining Algorithms for Dense Database", National Data Engineering Workshops (DEWS), year 2006.

Ayres et al., "Sequential Pattern Mining using a Bitmap Representation", Proceedings of the eighth ACM SIGKDD international conference on Knowledge discovery and data mining, Edmonton, Canada, Jul. 23-26, 2002.

Wang et al., "BIDE: Efficient Mining of Frequent Closed Sequence", Proceedings of 2010 International Conference on Information Retrieval & Knowledge Management, pp. 270-275, Sham Alam, Selangor, Mar. 17-18, 2010.

Yan et al., "CloSpan: Mining Closed Sequential Patterns in Large Datasets", Proceedings of 2003 SIAM International Conference on Data Mining, San Francisco, USA, May 1-3, 2003.

Japanese Patent Application # 2009532956 Official Action dated Mar. 21, 2012.

International Application PCT/IB2011/053671 Search Report dated Jan. 9, 2012.

U.S. Appl. No. 12/443,824 Official Action dated Dec. 19, 2012.

U.S. Appl. No. 12/443,824 Official Action dated Apr. 6, 2012.

U.S. Appl. No. 12/443,824 Official Action dated Oct. 11, 2011.

Lange et al., "Comparing Graph-based Program Comprehension Tools to Relational Database-based Tools", IEEE 0-7695-1131-7/01, pp. 209-218, year 2001.

Beyer et al., "The BLAST Query Language for Software Verification", Springer-Verlag Berlin Heidelberg, pp. 2-18, year 2004.

Pingali et al., "Optimal Control Dependence Computation and the Roman Chariots Problem", ACM Transactions on Programming Languages and Systems, vol. 19, No. 3, pp. 462-485, May 1997.

U.S. Appl. No. 12/443,824 office action dated Aug. 22, 2013.

SAP, Java web application security best practice guide, SAP,Document version 2.0, pp. 1-48, May 2006.

Skedzielewski et al., "Data flow graph optimization in IF1", Functional programming languages and computer architecture (book), publisher Springer Berlin Heidelberg, pp. 17-34, year 1985.

Siman, M., International Application PCT/IB2013/058741 filed Sep. 22, 2013.

European Application # 11819494.3 Search Report dated Apr. 4, 2014.

Zhenmin et al, "PR-Miner: Automatically Extracting Implicit Programming Rules and Detecting Violations in Large Software Code", ACM Sigsoft Software Engineering Notes, vol. 30, No. 5, pp. 306-315, Sep. 1, 2005.

Thummalapenta et al, "Alattin: Mining Alternative Patterns for detecting Neglected Conditions", 24th IEEE/ACM International Conference on IEEE Automated Software Engineering, pp. 283-294, Nov. 16, 2009.

Kim et al, "Supporting software development through declaratively codified programming patterns", Expert Systems with Applications, vol. 23, No. 4, pp. 405-413, Nov. 1, 2002.

U.S. Appl. No. 13/811,271 Office Acton dated Sep. 29, 2014.

U.S. Appl. No. 13/811,271 Office Acton dated Mar. 4, 2015.

Ford et al., "Analyzing and Detecting Malicious Flash Advertisements", ACSAC Proceedings of the 2009 Annual Computer Security Applications Conference, pp. 363-372 , 2009.

Yamada et al., "A defect Detection Method for Object-Oriented Programs using Sequential Pattern Mining", vol. 2009-CSEC-45, pp. 1-8, Jun. 15, 2009.

* cited by examiner

LOCATING SECURITY VULNERABILITIES IN SOURCE CODE

CROSS-REFERENCE TO RELATED APPLICATIONS

This Application is a continuation of U.S. patent application Ser. No. 12/443,824, filed Apr. 1, 2009, in the national phase of PCT Patent Application PCT/IL07/01233, filed Oct. 15, 2007, which claims the benefit of U.S. Provisional Application No. 60/853,349, filed Oct. 19, 2006, which is herein incorporated by reference.

BACKGROUND OF THE INVENTION

1. Field of the Invention

This invention relates to vulnerability assessment of computer software. More particularly, this invention relates to scanning application source code automatically to detect application level vulnerabilities.

2. Description of the Related Art

Enterprise security solutions have historically focused on network and host security, e.g., using so-called "perimeter protection" techniques. Despite these efforts, application level vulnerabilities remain as serious threats. Detection of such vulnerabilities has been attempted by lexical analysis of source code. This typically results in large numbers of false positive indications. Line-by-line code analysis has been proposed. However, this has proved to be impractical, as modern software suites typically have thousands of lines of code. Indeed, even in relatively compact environments, such as J2EE™ (Java™ 2 Standard Edition), a runtime module may include thousands of classes.

One technique for detection of vulnerabilities is exemplified by U.S. Patent Application Publication No. 2006/0253841, entitled "Software Analysis Framework". This technique involves decompilation to parse executable code, identifying and recursively modeling data flows, identifying and recursively modeling control flow, and iteratively refining these models to provide a complete model at the nanocode level.

Static analysis of program code is disclosed in U.S. Patent Application Publication No. 2005/0015752, entitled "Static Analysis Based Error Reduction for Software Applications". A set of analyses sifts through the program code and identifies programming security and/or privacy model coding errors. A further evaluation of the program is then performed using control and data flow analyses.

Another approach is proposed in U.S. Patent Application Publication No. 2004/0255277, entitled "Method and system for Detecting Race Condition Vulnerabilities in Source Code". Source code is parsed into an intermediate representation. Models are derived for the code and then analyzed in conjunction with pre-specified rules about the routines to determine if the routines possess one or more of pre-selected vulnerabilities.

Some attempts have been made to examine source code. U.S. Patent Application Publication No. 2003/0056192, entitled "Source Code Analysis System and Method", proposes building a database associated with a software application. A viewer provides access to the contents of the database. Relevant information may then be displayed, including module-to-module communication, calls made to databases or external files, and variable usage throughout the application. Presumably, the operator would be able to identify vulnerabilities from the display.

SUMMARY OF THE INVENTION

According to aspects of the invention, an automatic tool analyzes application source code for application level vulnerabilities. The tool integrates seamlessly into the software development process, so vulnerabilities are found early in the software development life cycle, when removing the defects is far cheaper than in the post-production phase. Operation of the tool is based on static analysis, but makes use of a variety of techniques, for example, methods for dealing with obfuscated code.

An embodiment of the invention provides a data processing system for detecting security vulnerabilities in a computer program, including a memory having computer program instructions stored therein, an I/O facility, and a processor accessing the memory to read the instructions, wherein the instructions cause the processor to receive source code to be analyzed via the I/O facility, the source code including code elements and statements, at least a portion of the statements referencing variables, and the variables including data structures having member variables. The processor is operative to construct an object-oriented model of the source code by assigning respective identifiers to the member variables. The processor is operative, using the model, to construct a control flow graph including nodes, derive a data flow graph from the control flow graph, derive a control dependence graph from the control flow graph, analyze the control flow graph, the data flow graph and the control dependence graph to identify a portion of the source code having a security vulnerability by identifying references to a predetermined member variable using the respective identifiers thereof, wherein the member name of the predetermined member variable is identical to the member name of another member variable, and to report the security vulnerability.

According to an aspect of the data processing system, the processor is operative to modify the source code to remove the security vulnerability.

According to another aspect of the data processing system, the processor is operative to code-slice the control dependence graph to define blocks of the control dependence graph that represent atomic elements of the source code, wherein no more than a single action is performed.

According to yet another aspect of the data processing system, the processor is operative to identify data flow nodes in the data flow graph wherein input data is validated, and verify that the input data is validated in the identified data flow nodes in accordance with a predetermined specification.

According to a further aspect of the data processing system, the processor is operative to apply software fault tree analysis to the source code.

According to an aspect of the data processing system, the processor is operative to generate test cases for a data validation function to identify scenarios wherein the data validation function fails.

An embodiment of the invention provides a data processing system for detecting security vulnerabilities in a computer program, including a memory having computer program instructions stored therein, an I/O facility, and a processor accessing the memory to read the instructions, wherein the instructions cause the processor to receive source code to be analyzed via the I/O facility, the source code including code elements and statements, at least a portion of the statements referencing variables. The processor is operative to construct an object-oriented model of the source code, wherein the code elements are represented by respective objects, using the model, construct a control flow graph including nodes, derive a data flow graph from the control flow graph, derive a control dependence graph from the control flow graph, analyze the control flow graph, the data flow graph and the control dependence graph to identify a portion of the source code having a security vulnerability, by traversing a first portion of the control dependence graph a first time, and marking a traversed segment of the control dependence graph, and thereafter traversing a second time a second portion of the control dependence graph that includes the marked segment by skipping the marked segment, and report the security vulnerability.

An embodiment of the invention provides a data processing system for detecting security vulnerabilities in a computer program, including a memory having computer program instructions stored therein, an I/O facility, and a processor accessing the memory to read the instructions, wherein the instructions cause the processor to receive source code to be analyzed via the I/O facility, the source code including code elements and statements. The processor is operative to construct an object-oriented model of the source code, wherein the code elements are represented by respective objects, using the model, construct a control flow graph including nodes, derive a data flow graph from the control flow graph, derive a control dependence graph from the control flow graph, analyze the control flow graph, the data flow graph and the control dependence graph to identify a portion of the source code having a security vulnerability by identifying in the data flow graph first data flow nodes wherein input is accepted, second data flow nodes wherein data is validated, and third data flow nodes wherein data is consumed, removing the second data flow nodes from the data flow graph, thereafter determining that one of the third data flow nodes is connected to one of the first data flow nodes by one of the data flow edges, and to report the one third data flow node as having an unvalidated input vulnerability.

An embodiment of the invention provides a data processing system for detecting security vulnerabilities in a computer program, including a memory having computer program instructions stored therein, an I/O facility, and a processor accessing the memory to read the instructions, wherein the instructions cause the processor to receive source code to be analyzed via the I/O facility, wherein the code elements are represented by respective objects. The processor is operative, using the model, to construct a control flow graph including nodes, wherein the control flow graph describes a plurality of functions in the source code, the variables further comprise global variables, and the global variables are passed to the functions as a super-global variable having the global variables as data members thereof, derive a data flow graph from the control flow graph, derive a control dependence graph from the control flow graph, analyze the control flow graph, the data flow graph and the control dependence graph to identify a portion of the source code having a security vulnerability, and report the security vulnerability.

An embodiment of the invention provides a data processing system for detecting security vulnerabilities in a computer program, including a memory having computer program instructions stored therein, an I/O facility, and a processor accessing the memory to read the instructions, wherein the instructions cause the processor to receive source code to be analyzed via the I/O facility, the source code including code elements and statements, at least a portion of the statements referencing variables. The processor is operative to construct an object-oriented model of the source code, wherein the code elements are represented by respective objects, using the model, construct a control flow graph, derive a data flow graph from the control flow graph, the data flow graph including data flow nodes and data flow edges connecting the data flow nodes. The processor is operative to derive the data flow graph by associating a first array and a second array with each of the data flow nodes, wherein the first array holds static information regarding ones of the variables on which its respective associated data flow node depends, and the second array holds information that identifies other variables that influence the associated data flow node, the other variables being associated with others of the data flow nodes. The processor is operative to perform a traversal of the control flow graph, and at each of the nodes thereof establish the information in the second array of a corresponding data flow node in the data flow graph, and responsively to the information, to construct data flow edges to connect data flow nodes with the others of the data flow nodes, respectively, derive a control dependence graph from the control flow graph, analyze the control flow graph, the data flow graph and the control dependence graph to identify a portion of the source code has a security vulnerability and report the security vulnerability.

An embodiment of the invention provides a data processing system for detecting security vulnerabilities in a computer program, including a memory having computer program instructions stored therein, an I/O facility, and a processor accessing the memory to read the instructions, wherein the instructions cause the processor to receive source code to be analyzed via the I/O facility, the source code including code elements and statements, at least a portion of the statements referencing variables, the variables including member variables, the member variables has member names, construct an object-oriented model of the source code, wherein the code elements are represented by respective objects. Using the model, the processor is operative to construct a control flow graph including nodes, each of the nodes has a topological order in the control flow graph, and a portion of the nodes has at least one child node, derive a data flow graph from the control flow graph, the data flow graph including data flow nodes and data flow edges connecting the data flow nodes, derive a control dependence graph from the control flow graph has control dependence nodes. The processor is operative to derive the control dependence graph by assigning each of the nodes of the control flow graph an innate property that is inherited by the at least one child node thereof in equal proportions as inherited properties therein, in each of the nodes canceling ones of the inherited properties that sum to the innate property thereof, maintaining respective inheritance records of the inherited properties of the nodes, the inheritance records including identifications of the nodes that are sources of origin of respective the inherited properties, identifying an entry node in the control flow graph, identifying a first set of the nodes whose members lack inherited properties, establishing respective first edges between members of the first set and the entry node, identifying a second set of the nodes, wherein members of the second set have inherited properties, identifying in members of the second set a respective closest topological order of the sources of origin in the inheritance records thereof, respectively, and constructing second edges between the members of the second set and the sources of origin having the closest topological order, respectively. The processor is operative to analyze the control flow graph, the data flow graph and the control dependence graph to identify a portion of the source code has a security vulnerability and report the security vulnerability.

Other embodiments of the invention provide methods and computer software products for carrying out the functions of the data processing system.

BRIEF DESCRIPTION OF THE DRAWINGS

For a better understanding of the present invention, reference is made to the detailed description of the invention, by way of example, which is to be read in conjunction with the following drawings, wherein like elements are given like reference numerals, and wherein.

DETAILED DESCRIPTION OF THE INVENTION

In the following description, numerous specific details are set forth in order to provide a thorough understanding of the present invention. It will be apparent to one skilled in the art, however, that the present invention may be practiced without these specific details. In other instances, well-known circuits, control logic, and the details of computer program instructions for conventional algorithms and processes have not been shown in detail in order not to obscure the present invention unnecessarily.

Software programming code, which embodies aspects of the present invention, is typically maintained in permanent storage, such as a computer readable medium. In a client/server environment, such software programming code may be stored on a client or a server. The software programming code may be embodied on any of a variety of known media for use with a data processing system, such as a diskette, or hard drive, or CD-ROM. The code may be distributed on such media, or may be distributed to users from the memory or storage of one computer system over a network of some type to other computer systems for use by users of such other systems.

Definitions.

The term "vulnerability" refers to a section of program source code, which when executed, has the potential to allow external inputs to cause improper or undesired behavior. Examples of vulnerabilities include buffer overflow, race conditions, and privilege escalation.

"Control flow" refers to a logical execution sequence of program instructions beginning, logically, at the beginning, traversing various loops and control transferring statements (branches), and concluding with the end or termination point of the program.

A "control flow graph" (CFG) is a graphical representation of paths that might be traversed through a program during its execution. Each node in the graph represents a basic block, i.e., a straight-line piece of code without any jumps or jump targets; jump targets start a block, and jumps end a block. Directed edges are used to represent jumps in the control flow.

"Data flow" refers to the process within the program whereby variables and data elements, i.e., data that is stored in program memory either dynamically or statically on some external memory unit, are read from or written to memory. Data flow includes the process whereby variables or data inputs or outputs are defined by name and content and used and/or modified program execution. Data flow may be graphically represented as a "data flow graph".

System Overview.

Figure 1:
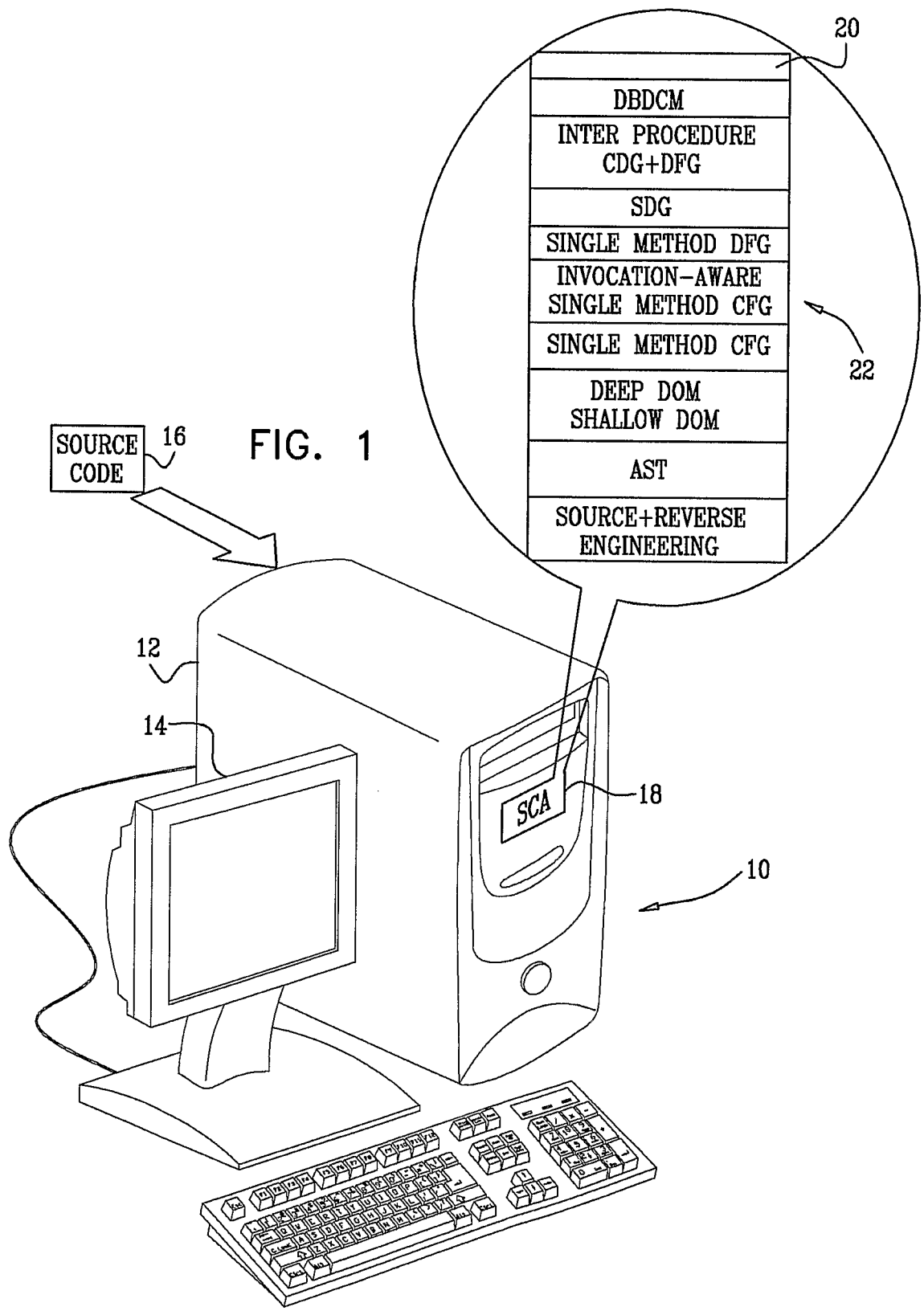
FIG. 1 is a block diagram of a system for processing computer program code, in accordance with a disclosed embodiment of the invention.

Turning now to the drawings, reference is initially made to FIG. 1, which is a block diagram of a system 10 for processing computer program code, in accordance with a disclosed embodiment of the invention. The system 10 typically comprises a general purpose or embedded computer 12, which is provided with conventional memory and I/O facilities, and programmed with suitable software for carrying out the functions described hereinbelow. Thus, although portions of the system 10 are shown as comprising a number of separate functional blocks, these blocks are not necessarily separate physical entities, but rather represent different computing tasks or data objects stored in a memory that is accessible to the processor. These tasks may be carried out in software running on a single processor, or on multiple processors. The software may be provided to the processor or processors on tangible media, such as CD-ROM or non-volatile memory or may be retrieved from storage over data networks. Alternatively or additionally, the system 10 may comprise a digital signal processor or hard-wired logic. The system 10 may include a display 14, enabling an operator to interact with the system, typically via a graphical user interface.

The system 10 receives application source code 16, which is intended to be transformed into executable code. Typically, the transformation is accomplished by compilation to generate object code, and linking of the object code with library code, as is known in the art. However, the principles of the invention are equally applicable to software development systems in which intermediate representations are employed, or development environments employing source code interpreters.

The system 10 includes a source code analyzer 18 (SCA). This is a module that automatically scans the source code 16 in order to detect application level vulnerabilities. The source code analyzer 18 comprises a plurality of distinct layers, which can be independently modified. Each of the layers is coupled only to adjacent layers, which provides a considerable degree of isolation. Modifications to one of the layers generally affect only the succeeding layer that receives input from the modified layer. One layer is a security-related layer 20, which holds a set of queries that detect various types of security vulnerabilities, which are discussed in further detail below. The other layers in aggregate form a SCA engine 22 that is harnessed by the security-related layer 20. The modular architecture provides a high degree of flexibility. For example, it possible to exchange the security-related layer 20 with another module that interfaces with the SCA engine 22. The layers forming the SCA engine 22 perform a variety of functions relating to the application being analyzed, e.g., evaluation of reliability, performance, and compliance with specifications and standards.

Figure 2:
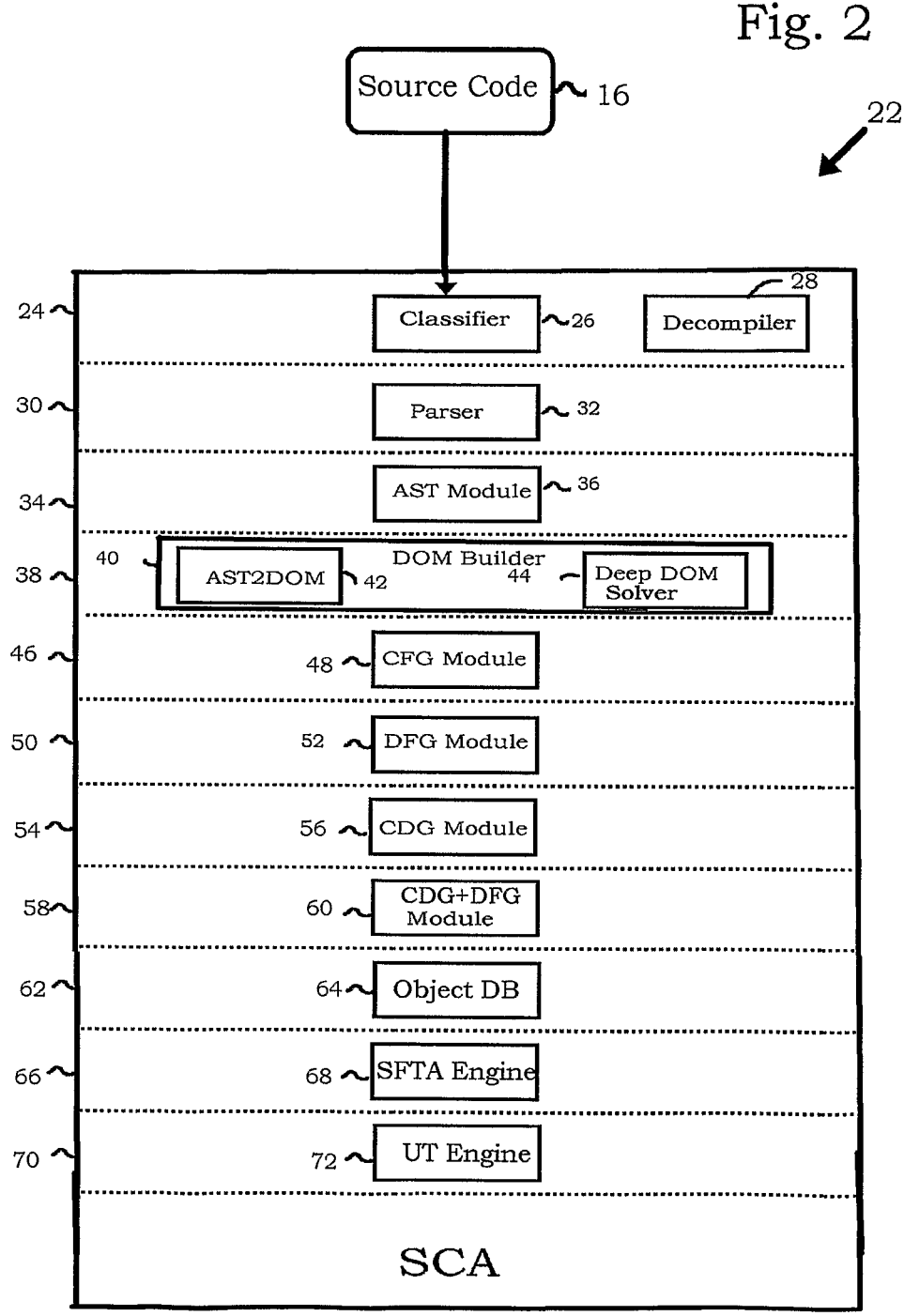
FIG. 2 is a detailed block diagram of a source code analysis engine shown in FIG. 1, in accordance with a disclosed embodiment of the invention.

Reference is now made to FIG. 2, which is a block diagram of the SCA engine 22 (FIG. 1), in accordance with a disclosed embodiment of the invention. The SCA engine 22 has the following layers and components, which are described in further detail herein-below:

layer 24 (including classification module 26 and decompiler 28);
    layer 30 (parser 32);
    layer 34 (AST module 36);
    layer 38 (DOM builder 40, including shallow DOM solver 42 and deep DOM solver 44);
    layer 46 (CFG module 48);
    layer 50 (DFG module 52);
    layer 54 (CDG module 56);
    layer 58 (CDG+DFG module 60);
    layer 62 (database 64);
    layer 66 (SFTA engine 68); and
    layer 70 (unit testing engine 72).

Source Code Analyzer—Classification.

Source code 16 constitutes the principle input to the SCA engine 22. The source code 16 is passed to classification module 26. Current versions of the SCA engine 22 are capable of scanning source code written in Java, C#, .NET, and server-side scripting languages JSP (Java Server Page) language, and ASPX (Active Server Page Framework). It should be noted, however, that the principles of the invention disclosed herein are not limited to these particular languages. Converters may be constructed by those skilled in the art that enable the SCA engine 22 to process other computer languages. The classification module 26 determines which language is applicable to the source code 16. If the source code 16 is malformed or is presented in a language to which the SCA engine 22 has not been adapted, then the classification module 26 reports an error.

The SCA engine 22 can scan programs developed in environments that transform source code into intermediate representations, using known decompilation techniques. For example both the .NET™ framework and Java platform work by transforming source code into an intermediate language, rather than machine code, Recognition by the SCA engine 22 that the source code 16 is received in an intermediate representation invokes the decompiler 28, which transforms the intermediate code into a higher level representation that is capable of being analyzed in the SCA engine 22. The decompiler 28 and elements of the classification module 26 can be constructed using known techniques, as taught in U.S. Pat. Nos. 5,881,290, 5,586,330, 5,586,328, and 7,210,133, which are herein incorporated by reference. A suitable decompiler, "Reflector for .NET" is available from Lutz Roeder via the Internet.

Some programming practices tend to frustrate conventional code analyzers, for example code obfuscation. However, as the SCA engine 22 is oriented toward the evaluation of code logic, which is not destroyed by code obfuscation. Moreover, the SCA engine 22 is not troubled by often obscure identifiers that are generated in reverse engineered program code.

Modern programming languages, such as .NET support event driven programs. The call graph of such programs is often poorly defined, as the order of function calls is deferred until runtime. The SCA engine 22 makes no assumptions about the order of raising various events, including Web events that occur in ASPX and JSP code. Such events are converted to C# and Java code, respectively, with introduction of appropriate meta-loops and select-case switches. The classification module 26 and decompiler 28 form first layer 24.

Parsing.

Continuing to refer to FIG. 2, in layer 30 the classified and optionally decompiled source code is processed in the parser 32, where it is decomposed into individual tokens, The tokens are then passed into layer 34, and arranged, according to the grammar of the particular language, into an abstract syntax tree (AST) in AST module 36. This step is conventional. For example, the tool ANTLR, available from antlr.org on the Internet, is suitable for use as the AST module 36.

DOM Builder.

The DOM builder 40 in layer 38, produces a document object model (DOM), which represents each code element of the abstract syntax tree by a matching object. The DOM builder 40 comprises two principle modules. The shallow DOM solver 42 (AST2DOM) receives a language-dependent abstract syntax tree, and returns an almost language-independent document object model. The output of the shallow DOM solver 42 is a "shallow" representation, in which logical connections between distant objects have yet to be established. The deep DOM solver 44 creates these connections based on relevant specifications of the language, which produces a document object model that is fully language-independent. The implication is that subsequent layers that make use of the document object model need not be languageaware. Thus, in order to support a new language, at most only the layers 24, 30, 34, 38 may need to be changed. Layers succeeding the layer 38 are unaware of the source code language.

Operation of the deep DOM solver of the deep DOM solver 44 can be appreciated by a consideration of Listing 1. Analysis of source code may require a determination whether the references "i" indicate the same variable, or two different variables sharing the same identifier. If the two lines are in the same block, then the two references to "i" refer to one variable. However, if the lines are in two different blocks, then the determination depends on the visibility of the variables, the locations where they were declared, the inheritance hierarchy of containing class, etc. While the shallow DOM solver 42 recognizes variables. The connection between them is established in the deep DOM solver 44, where each variable referenced by the DOM builder 40 is assigned a data member named "InstanceID". The shallow DOM solver 42 assigns each referenced variable a different value for the member InstanceID, even if they reference the same variable. Thus in Listing 1, the two references to "i" receive different values of the member InstanceID, even if the both refer to the same variable. In the deep DOM solver 44, all references to the same variable are assigned the same value to its member InstanceID. Methods have a similar mechanism, but instead of the member InstanceID, method declarations and invocations are assigned a member known as "DefinitionID", which serves the same purpose.

EXAMPLE 1

Figure 3:
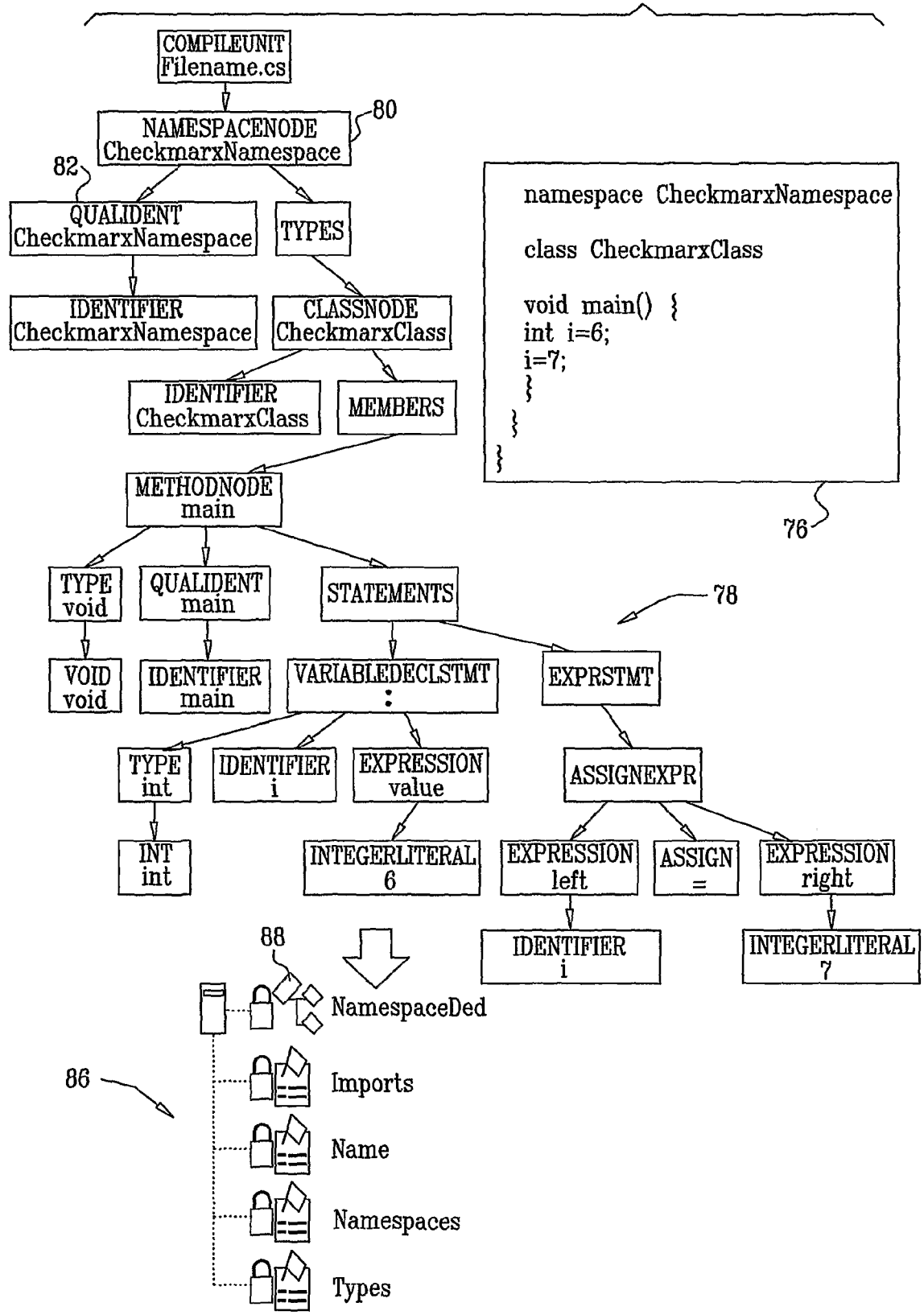
FIG. 3 is a composite diagram illustrating aspects of source code analysis using the source code analysis engine shown in FIG. 1, in accordance with a disclosed embodiment of the invention.

Reference is now made to FIG. 3, which is a composite illustration illustrating aspects of source code analysis using the SCA engine 22 (FIG. 2), in accordance with a disclosed embodiment of the invention. Exemplary source code 76 has been processed to form an abstract syntax tree 78. A node 80 "NAMESPACENODE" in the second row of the abstract syntax tree 78 has a child node 82 "QUALIDENT" (QUALified IDENTifier). The node 82 has the value of "Checkmarx-Namespace", corresponding to an identifier 84 in the first line of the source code 76. This is the name of the namespace, but as far as the abstract syntax tree 78 is concerned, it is merely a string of characters representing an identifier. Knowledge that the identifier 84 identifies a namespace is exploited by the shallow DOM solver 42 of the DOM builder 40 (FIG. 2). This knowledge is captured in a document object model, a portion of which is shown as a DOM fragment 86. In this example, a DOM object 88 "NamespaceDecl" is created, and its data member "Name" is initialized with the value "Checkmarx-Namespace". Some properties are shown below the object 88.

Referring again to FIG. 2, the following issues are dealt with by the deep DOM solver 44: These are conventional, and are therefore not further discussed herein in the interest of brevity.

Type resolution;
Inheritance resolution;
Variables resolution;
Methods overloading resolution;
Methods overriding resolution;
Overloading resolution;
Polymorphism resolution;
Data member resolution (public/private/protected);
Constructors resolution;
"This" resolution;
Chaining; and
Base calling.

In addition, a procedure known as "member variable instances" is performed. Member variables are fields within a data structure, e.g., a C++ class. Normally, member variables are used in different functions or methods, but defined outside the functions or methods. In the DOM builder 40, each member variable receives a unique ID number. Thus, different member variables having like member names and having parents of like data types (e.g., member name ".x" in member variables a.x, b.x) are distinguished from one another, and considered as different variables. Some conventional integrated development environments, e.g., Visual Studio®, have a feature that finds all references to a designated variable. Referring now to Listing 2, invoking the "member variable instances" procedure for a variable "j" (line 13), results in a finding of two references—a declaration for the variable j in line 9 and an assignment in line 13. Now consider references to a variable "a.x" in line 14. One expects to find two results—a declaration (line 3) and an assignment (line 14). However, Visual Studio would return an additional result—an assignment of a member variable b.x (line 15). This unwanted result is due to the fact that Visual Studio does not distinguish member variables having commonly named field, such as a.x and b.x from one another. The DOM builder 40, however, can tell them apart. The deep DOM solver 44 would assign the different values to the member InstanceID for the member variables a.x and b.x. The member DefinitionID together with the member InstanceID allow the member variables to be differentiated Control Flow Graphs.

Control flow graphs are constructed in layer 46 (FIG. 2), using CFG module 48.

Figure 4:
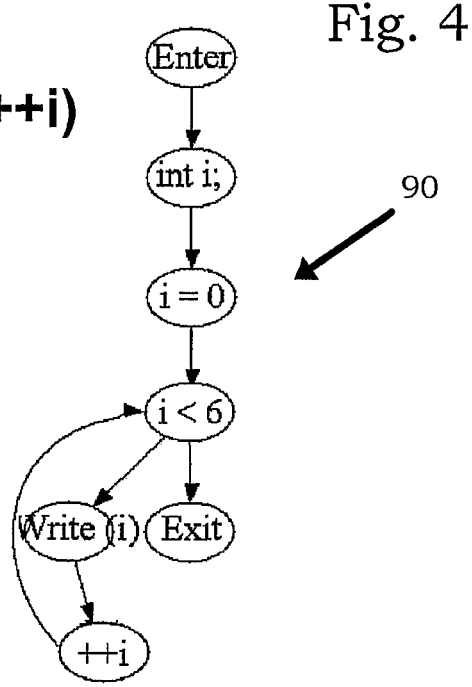
FIG. 4 is a control flow graph that represents a single source code statement, in accordance with a disclosed embodiment of the invention.

Each node of a control flow graph produced by the SCA engine 22 represents a single statement. Furthermore, in most cases, when a single statement contains several expressions, each expression is represented by its own node. Reference is now made to FIG. 4, which is a control flow graph 90 that represents a single source code statement, a "for" statement, in accordance with a disclosed embodiment of the invention. The control flow graph 90 illustrates how the components of the statement are elaborated into a plurality of nodes.

The CFG module 48 initially computes modular control flow graphs for single methods. Invocations of other methods are left intact, and complex expressions are divided into several atomic expressions, while preserving the logic of the expressions. The efficiency of this stage is O(n), where n is the number of sub expressions in the code. For example, in the control flow graph 90, the invocation Write( ) is not further analyzed.

The next phase in the operation of the CFG module 48 is transformation of the control flow graph 90 into an invocation-aware single method control flow graph. In order to be able to integrate a plurality of methods, a placeholder for the invoked method has to be prepared. A stub is prepared. If source code is available, it eventually replaces the stub. Furthermore, in practice a calling method has makes preparations before the call, and performs "cleanup" after return. Similarly, the called method must make some preparation at the beginning and cleanup at the end of the call.

Figure 5:
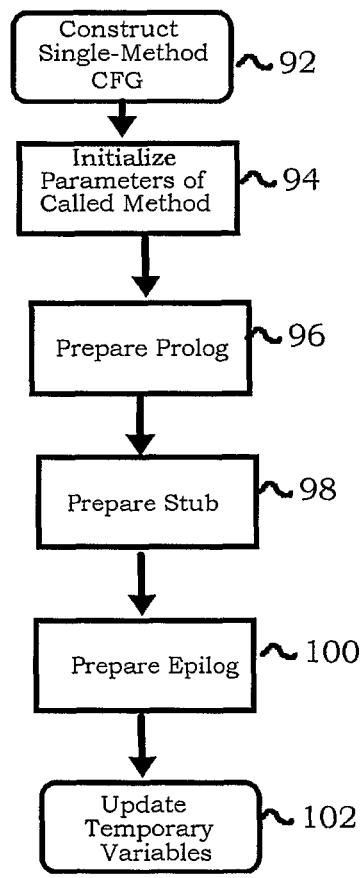
FIG. 5, is a flow chart of a method of constructing an invocation-aware single method control flow graph, in accordance with a disclosed embodiment of the invention.

Reference is now made to FIG. 5, which is a flow chart of a method of constructing an invocation-aware single method control flow graph, in accordance with a disclosed embodiment of the invention. At initial step 92, a single method control flow graph is prepared, as described in FIG. 4.

Next, at step 94, the calling method, which is the method described by the control flow graph prepared in step 92, initializes the parameters to be sent to a called method. The parameters include the "this" object, which may be manipulated during the call, and include global variables as well. It is desirable to create a container for the global variables to facilitate their transport.

Next, at step 96, the called method copies its parameters into temporary variables. These are placed in a section termed a "prolog".

Control now proceeds to step 98. A temporary stub is created as a placeholder in the control flow graph. In case the source code of the called method is not available, it is necessary to make assumptions about the use of the sent parameters by the called method. There are two main types of stubs that can be constructed in step 98. In the first type, it is assumed that the called method uses its parameters, but that it does not update them. In the second type, it is assumed that the parameters influence the "this" object. The decision about the use of each stub is based on several heuristics such as method's name, parameter names and number and the use of return value. The second type is used whenever the function name it replaces begins with "set*", "add*" or "append*", wherein the character "*" is a wild card operator. The first stub is used otherwise.

Step 100 is performed following step 98. The called method copies the parameters that it modifies ("out parameters"), which are typically "by reference" parameters, into temporary variables, termed an "epilog".

Next, at final step 102, the calling method updates the "out" parameters with new data in the temporary variables. The result of is a control flow graph of a single method, embellished with prologs and epilogs, and provided with a stub for each invoked method.

EXAMPLE 2

Figure 6:
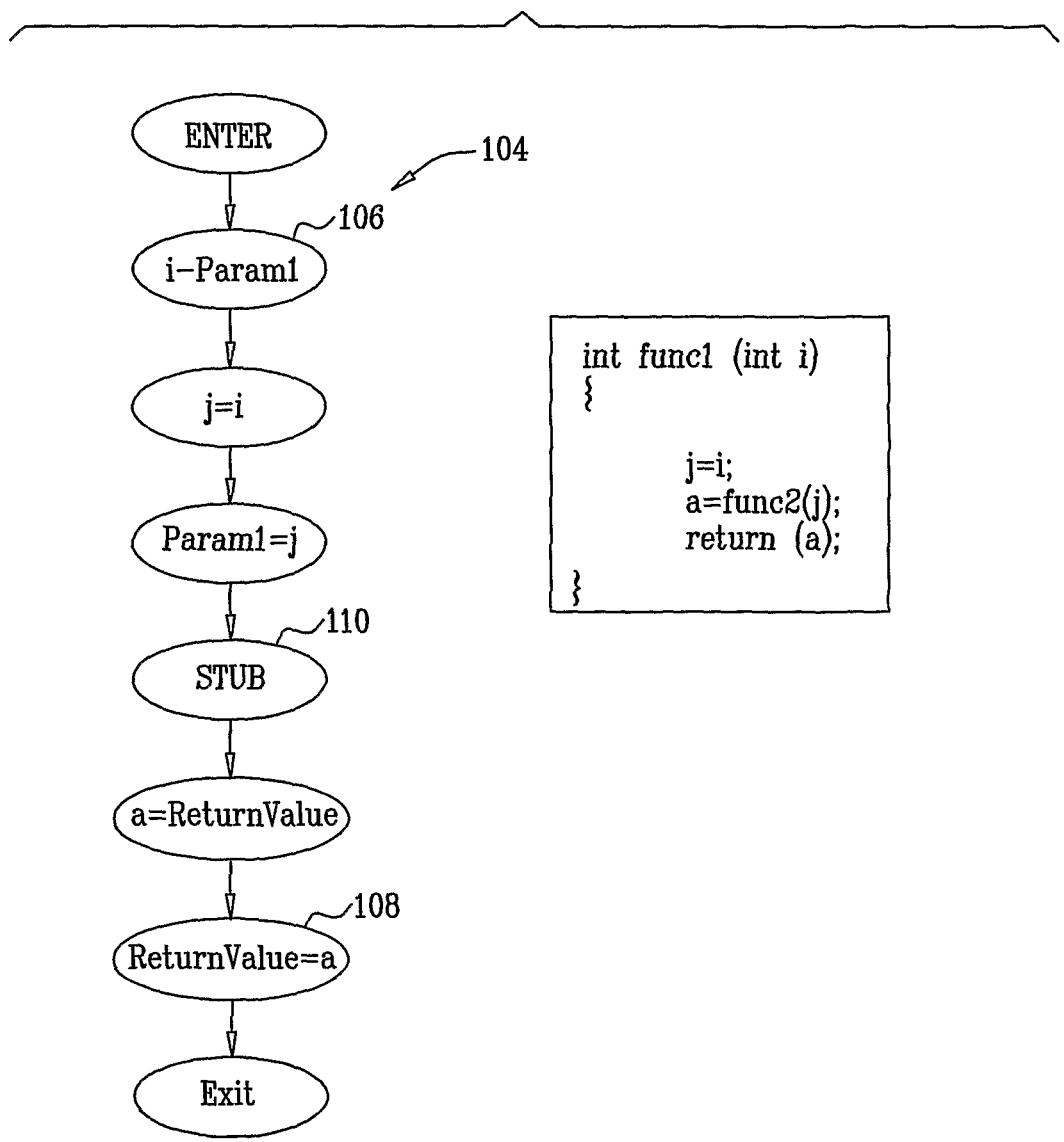
FIG. 6 is an exemplary invocation-aware single method control flow graph, in accordance with a disclosed embodiment of the invention.

Reference is now made to FIG. 6, which is an exemplary invocation-aware single method control flow graph 104, in accordance with a disclosed embodiment of the invention. The control flow graph 104 has nodes 106, 108 representing a prolog, and an epilog, respectively. A stub 110 for the called function, func 2 ( ), is included, because in this example source code is unavailable for the called function func 2 ( ).
Data Flow Graphs.

Figure 7:
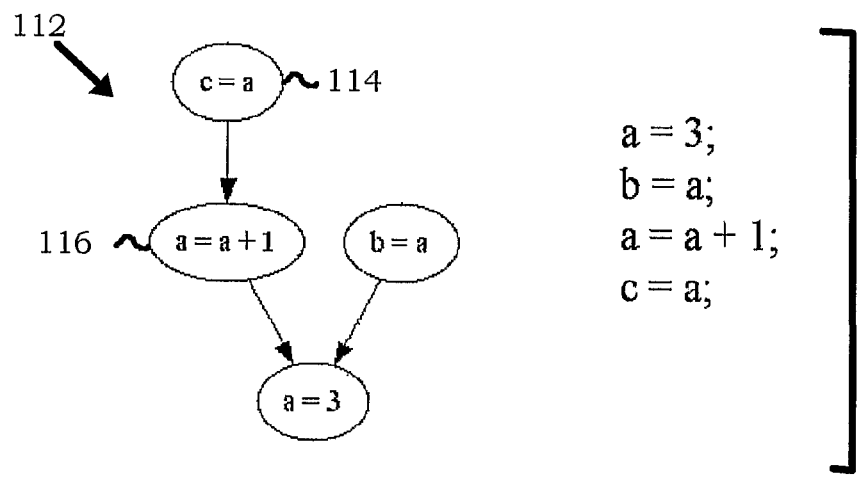
FIG. 7 is a data flow graph that is constructed in accordance with a disclosed embodiment of the invention.

Referring again to FIG. 2, data flow graphs are constructed in layer 50, using DFG module 52. Reference is now made to FIG. 7, which is a data flow graph 112 that is constructed in accordance with a disclosed embodiment of the invention. A data flow graph describes data flow within a single method. Each time a value is assigned to a variable, the influencing object and the location of the assignment is recorded. As a result, a graph can be constructed, in which the data flow nodes are variables in a specific location, and connections represent dependency. The graph is transitive. Thus, a backward transitive closure computed at a specific location retrieves all influencing variables. It will be noted that each node is directed to a node that affects or influences it. For example in node 114, the assigned value of the variable "c" is influenced by an assignment to a variable "a" in node 116.

Figure 8:
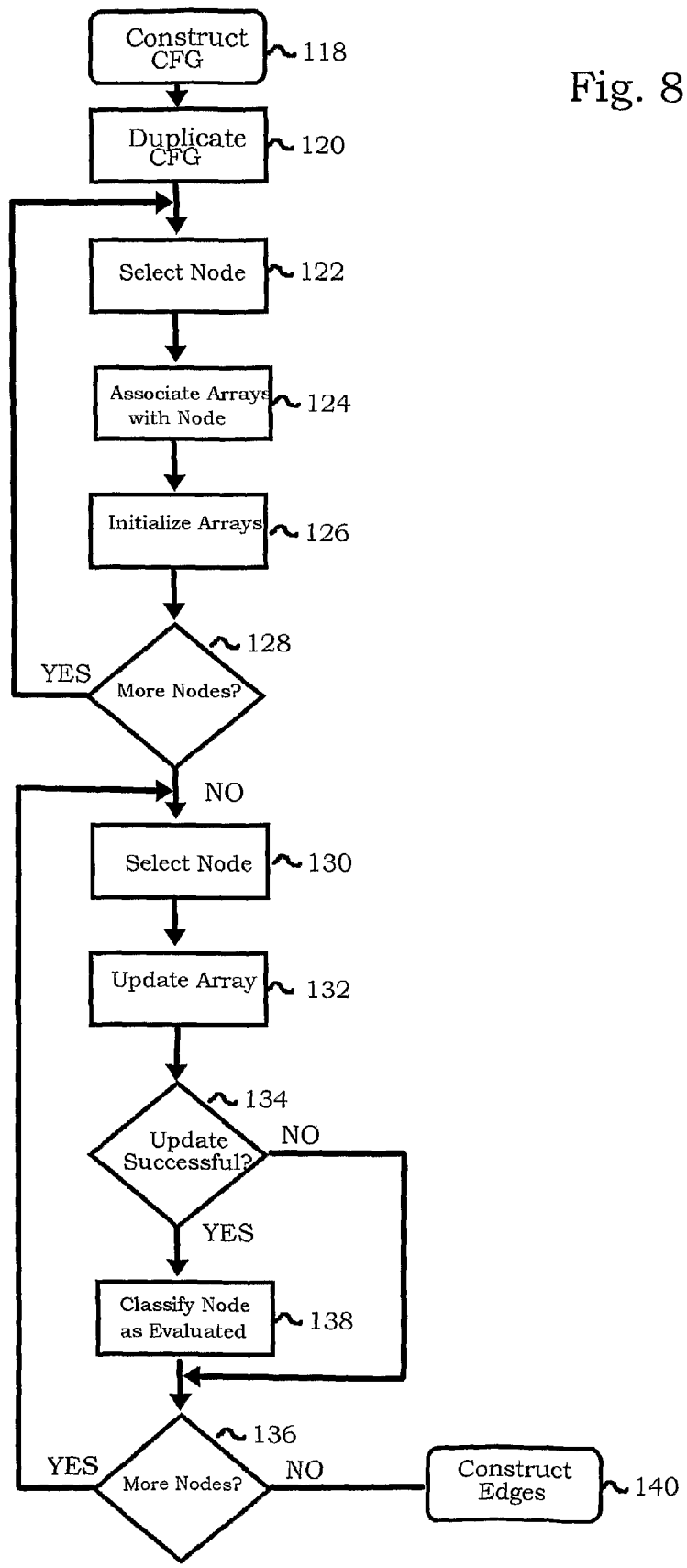
FIG. 8 is a flow chart of a method for constructing a data flow graph, in accordance with a disclosed embodiment of the invention.

Reference is now made to FIG. 8, which is a flow chart of a method for constructing a data flow graph, in accordance with a disclosed embodiment of the invention. The process steps are shown in a particular linear sequence in FIG. 8 for clarity of presentation. However, it will be evident that many of them can be performed in parallel, asynchronously, or in different orders.

At initial step 118, a method is selected, and a control flow graph for the method constructed as described above with reference to FIG. 5. The data flow graph is based on the control flow graph. A unique identifier is assigned to each node of at least the duplicate control flow graph.

Next, at step 120 the nodes of the control flow graph prepared in initial step 118 are duplicated. The duplicated nodes are to be used for constructing the data flow graph by establishing appropriate edges. The original control flow graph is normally used for other purposes by the SCA engine 22 (FIG. 2). Of course, in applications in which the original control flow is not required for other purposes, duplication may be omitted, and the original version used. Duplication of the nodes is typically implemented as a computer processing task in which the nodes are data objects, which are only optionally displayed to assist an operator.

Next, at step 122, a node is selected from the duplicated nodes. At this step, any nodes that do not relate to data are ignored, and may be discarded.

Next, at step 124 two arrays are created and associated with the currently selected duplicated node. These arrays are termed "VariablesThisBlockDependsOn" and "VariablesChangingLocations", which respectively contain static information regarding variables on which the current node depends, and dynamic information regarding variables that are currently known to influence the current duplicated node. As will be seen from the description below, the dynamic information is developed during a traversal of the data flow graph.

Next, at step 126, the arrays are initialized. The array VariablesThisBlockDependsOn is initialized with information that is stored in the current duplicated node. Once this array is filled, it never changes. For example, a duplicated node corresponding to a statement a=b causes the one element of the array VariablesThisBlockDependsOn for the duplicated node to be initialized with the value "b". Step 126 is sometimes descriptively termed "BuildSelfStatus". The array VariablesChangingLocations is initialized. The array VariablesChangingLocations is initialized with data relating to the current node. Linkage to nodes containing data that influence the current nod occurs at a later stage. In the example given, the statement a=b results in the one element of array VariablesChangingLocations being initialized with a key "a" and a value of "1".

Control now proceeds to decision step 128, where it is determined if more duplicated nodes in the control flow graph need to be processed. If the determination at decision step 128 is affirmative, then control returns to step 122 for selection of the next duplicated node.

If the determination at decision step 128 is negative, then a node-by-node traversal begins. The traversal order corresponds approximately to a breadth-first traversal of the original control flow graph. In a strict sense, a breadth-first search applies to a hierarchical tree structure. As the control flow graph may not be a hierarchical tree, the search initially solves parent nodes first and then proceeds from the parents in a breadth-first manner. Control proceeds to step 130. A duplicated node is selected.

Next, at step 132 an attempt is made to update the array VariablesChangingLocations for the current duplicated node by include all relevant variable information that could influence the current duplicated node. This is done by passing the array "by reference", rather than "by value" to the updating function. Passing the array by reference rather than a copy spares computational resources. The efficiency of this step is O(1). In some cases, there may not presently be sufficient information to do this, and the duplicated node may need to be revisited after first having completed step 132 recursively for the node's descendants. Nodes requiring revisits are marked. The marked nodes are then revisited in a depth-first manner.

Control now proceeds to decision step 134, where it is determined if the array for the current duplicated node was successfully updated in step 132. If the determination at decision step 134 is negative, then control proceeds to decision step 136, which is described below.

If the determination at decision step 134 is affirmative, then control proceeds to step 138. The node is classified as having been evaluated. Relevant edges will be established between the current node and other duplicated nodes upon which it depends after all nodes have been evaluated.

After performance of step 138, or if the determination at decision step 134 is negative, control proceeds to decision step 136, where it is determined if more duplicated nodes need to be visited or revisited. If the determination at decision step 136 is affirmative, then control returns to step 130.

If the determination at decision step 136 is affirmative, then control proceeds to final step 140. Relevant edges are now constructed between the nodes, as noted above in the discussion of step 138. This is done by first consulting the array VariablesThisBlockDependsOn, and then adding edges based on the array VariablesChangingLocations. The data flow graph is then complete, and the procedure ends.

EXAMPLE 3

Figure 9:
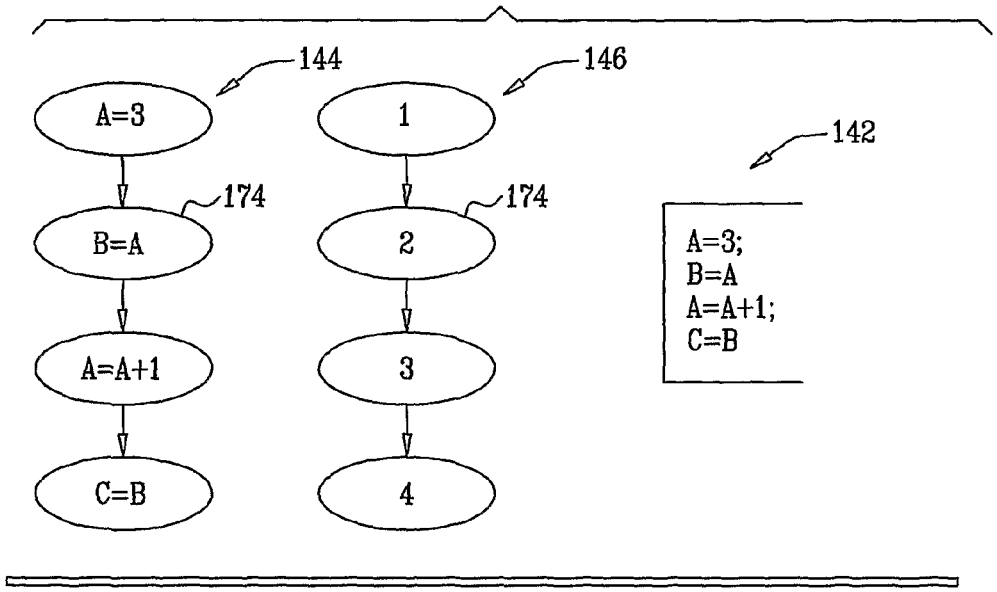
FIG. 9 is a diagram illustrating construction of a data flow graph according to the method shown in FIG. 8, in accordance with a disclosed embodiment of the invention.
Figure 9:
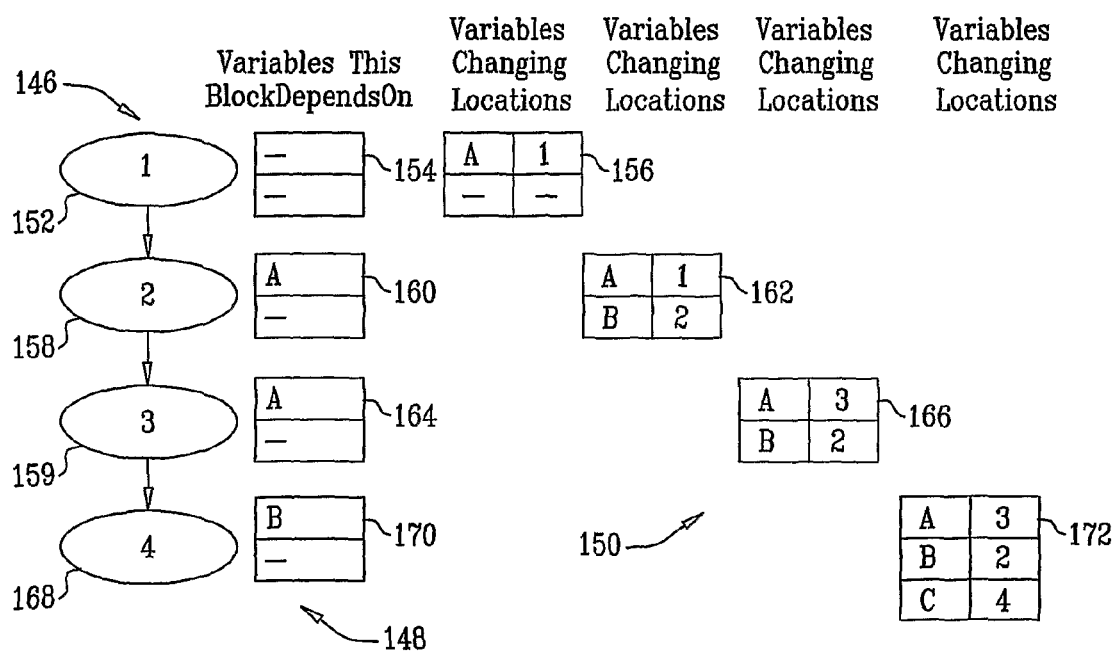

Reference is now made to FIG. 9, which is a diagram illustrating construction of a data flow graph according to the method described with reference to FIG. 8, in accordance with a disclosed embodiment of the invention. As shown in the upper portion of FIG. 9, a data flow graph is constructed from a fragment of source code 142.

A control flow graph 144 and a duplicate control flow graph 146 are prepared, and the nodes of the latter assigned unique identifiers (1, 2, 3, 4). In the lower portion of the duplicate control flow graph 146 has been elaborated to illustrate that each of its nodes is associated with respective tables of variables—a column 148 of tables containing respective arrays "VariablesThisBlockDependsOn", and a set of tables 150, each being offset according to the rank of its associated node in the duplicate control flow graph 146. For example node 152 has been assigned unique identifier "1', and has been associated with tables 154, 156. It will be recalled that each node represents a single source code statement. The purpose of table 154 is to identify those variables upon which the statement of source code 142, represented by the node 152, depends.

Similarly, node 158 is associated with tables 160, 162, node 159 with tables 164, 166, and node 168 with tables 170, 172.

Beginning at the top of the duplicate control flow graph 146 and progressing downward, the node where each variable was last changed is determined, and the actual data flow graph is constructed.

In the set of tables 150 each relevant variable is associated with a pointer to the node to which it relates. For example, node 158, corresponding to node 174 of control flow graph 144, represents the statement "B=A". Node 158 has an identifier "2". This identifier is found in table 162, together with the variable B, which is modified in the node 158.

Variables A and B are both relevant to node 158. The node 158 depends only on the variable A, as indicated by table 160. In table 162 Variable A has been entered in the upper row of table 162, and encoded "1", corresponding to node 152, where it was last modified. In the lower row, variable B has been encoded "2", as it was last modified in node 158. Variable C is not mentioned in the source code statement B=A", and is considered to be irrelevant to node 158. Variable C has no entry in the tables 160, 162.

Figure 10:
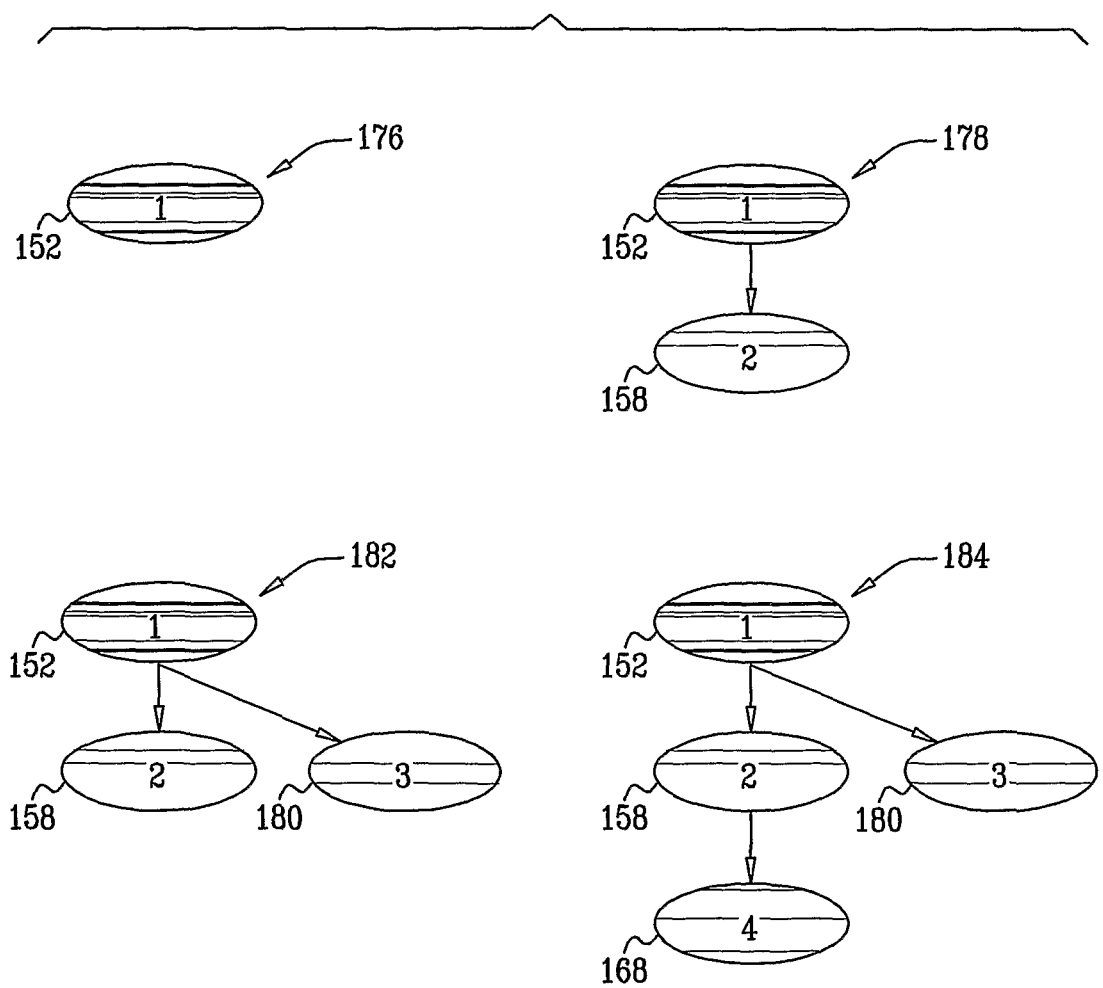
FIG. 10 is a diagram that illustrates a process of building a data flow graph in accordance with a disclosed embodiment of the invention.

Reference is now made to FIG. 10, which is a diagram that illustrates a process of building a data flow graph in accordance with a disclosed embodiment of the invention. The process is disclosed with continued reference to FIG. 9. Progressing downward in the duplicate control flow graph 146.

Variable A is changed in node 152, as indicated in partial data flow graph 176.

Variable B is changed in node 158. Node 158 depends on variable A, which was changed in node 152. This is illustrated by construction of a partial data flow graph 178 and the entries of tables 160, 162.

Variable A is again changed in node 159. Node 159 also depends on the variable A, last accessed in node 158, as indicated by table 164. A new partial data flow graph 182 is constructed to reflect this situation.

Variable C is changed in node 168. Node 168 depends on variable B that was previously changed in node 158, as shown in table 172. A complete data flow graph 184 can now be constructed.

In constructing the final data flow graph, each node is evaluated once by default. Furthermore, by virtue of the fact that the set of tables 150 are built incrementally, it is only necessary to evaluate each node only once for each variable on which it depends in each nesting level of the source code in which the variable appears. For example, if a statement is nested inside a "for" statement, which in turn is occurs inside an "if" statement, then at most the node corresponding to the statement will be solved three times. The efficiency is O(n*m) where n is the number of nodes and m is the deepest source code nesting level.

Metaconstructors.

Traditionally, object oriented languages, e.g., C++, did not allow data members to be initialized before the class constructor executed. Newer versions, e.g., .NET do allow early initialization of data members, i.e., at declaration time. Consequently, when employing the older languages, in order to construct a data flow graph, it is helpful to create a metaconstructor that performs all relevant assignment operations and initializations. In order to guarantee early initialization, the class constructor is written to invoke the metaconstructor before performing any of its routine functions.

In Listing 3, exemplary source code is presented, which illustrates the point. Variables "i" and "j" are initialized at the time of their declaration and not in the constructors. Adding a metaconstructor avoids any issues of uninitialized variables, and enables the data flow graph to be constructed more accurately. Addition of a metaconstructor to the code of Listing 3 is shown in Listing 4.

Control Dependence Graphs.

Control dependence graphs directed graphs that are known in the software engineering art, and are exploited by the SCA engine 22 (FIG. 2). Much like a data flow graph, a control dependence graph (CDG) shows the dependency of one statement on another, but the nature of the dependency is control rather than data. Each statement A is linked to a previous statement B, which controls whether statement A will be executed. In a control dependence graph, nodes or vertices represent executable statements, and edges represent direct control dependencies. Construction of control dependence graphs, however, is a known computational bottleneck, which is mitigated by aspects of the present invention.

Referring again to FIG. 2, control dependence graphs are constructed in layer 54, using CDG module 56, in which control dependence graphs are derived from control flow graphs produced by the CFG module 48 described above.

Construction of a control dependence graph is derived from a consideration of the shape, i.e., topology, of the corresponding control flow graph, rather than its content. It is assumed that each node of the control flow graph corresponds to one line of the source code. However, it is the structure of the control flow graph that is now of primary interest.

Each node is given an attribute, referred to herein as a "potential", which has a numerical value, and which is propagated to its descendents. Potential is a quantity, which is a reflection of a control influence of one node upon another. By tracking the propagation of potential through a control flow graph, it is possible to extract control dependence information and thereby construct an accurate control dependence graph. Only the general topology of the graph and the topological orders of individual nodes are significant in this process.

As a result of propagation of potential, when a record of the course of the propagation and the source of origin is maintained, it becomes evident that a node can possess many combinations of innate and inherited potentials, each component of which is treated separately. Several rules for the internodal propagation of potential are applicable:

Rule 1. Each node is initially assigned a potential having a value 1.0. This is referred to as "innate" potential.

Rule 2. A node propagates all its potentials to its child nodes. The value of the potentials is divided equally among its immediate child nodes. Potential propagated from a parent node to a child node is referred to as "inherited" potential in the child node. For example, in control flow graph 186, node 1 has two child nodes, node 2 and node 15. Each receives a potential contribution of 0.5 from node 1. Node 2 possesses its innate potential of 1.0 and an inherited potential of 0.5.

Rule 3. Propagation of a node's innate potential and propagation of its inherited potentials to a child node are treated as separate transactions.

Rule 4. Propagated potentials are labeled with their sources of origin. When a node has inherited multiple potentials from different origins, propagations of the multiple inherited potentials to nodal descendants are each treated individually, and accounted for separately. In the above example involving node 2, the inherited potential of 0.5 is tagged as originating from node 1.

Rule 5. When a node inherits a potential of exactly 1.0, the inherited potential is nullified. This can occur, for example, when a node has only one child. In the control flow graph 186, node 2 has only one child node, node 4. Node 4 has an innate potential of 1.0 in accordance with Rule 1. In a first transaction, in accordance with Rule 3, the innate potential of node 2 is propagated to node 4. Node 4 has thus inherited a potential having a value of 1.0. It is nullified. In a second transaction, node 4 receives the inherited potential (value 0.5) of node 2. The net effect is that node 4 has innate potential of value 1.0, and inherited potential of value 0.5, the latter tagged as originating from node 1. The terms "first transaction" and "second transaction" are used arbitrarily herein to distinguish the two transactions. These terms have no physical meanings with respect to the actual temporal order of the transactions.

Rule 6. Inherited potentials are additive for purposes of Rule 5. For example, a node may inherit potentials of 0.5 from each of two parents. The sum is 1.0. The two inherited potentials are therefore nullified. This actually occurs in node 13 of the control flow graph 186, and is described below.

In evaluating the potentials of a control flow graph, the graph is traversed. However, any node that cannot be immediately solved is ignored and visited later. Once a computation for the node is undertaken, that node is not revisited. To the extent possible, recognizing that nodes may have multiple parents, the traversal is conducted in a depth-first manner.

Figure 11:
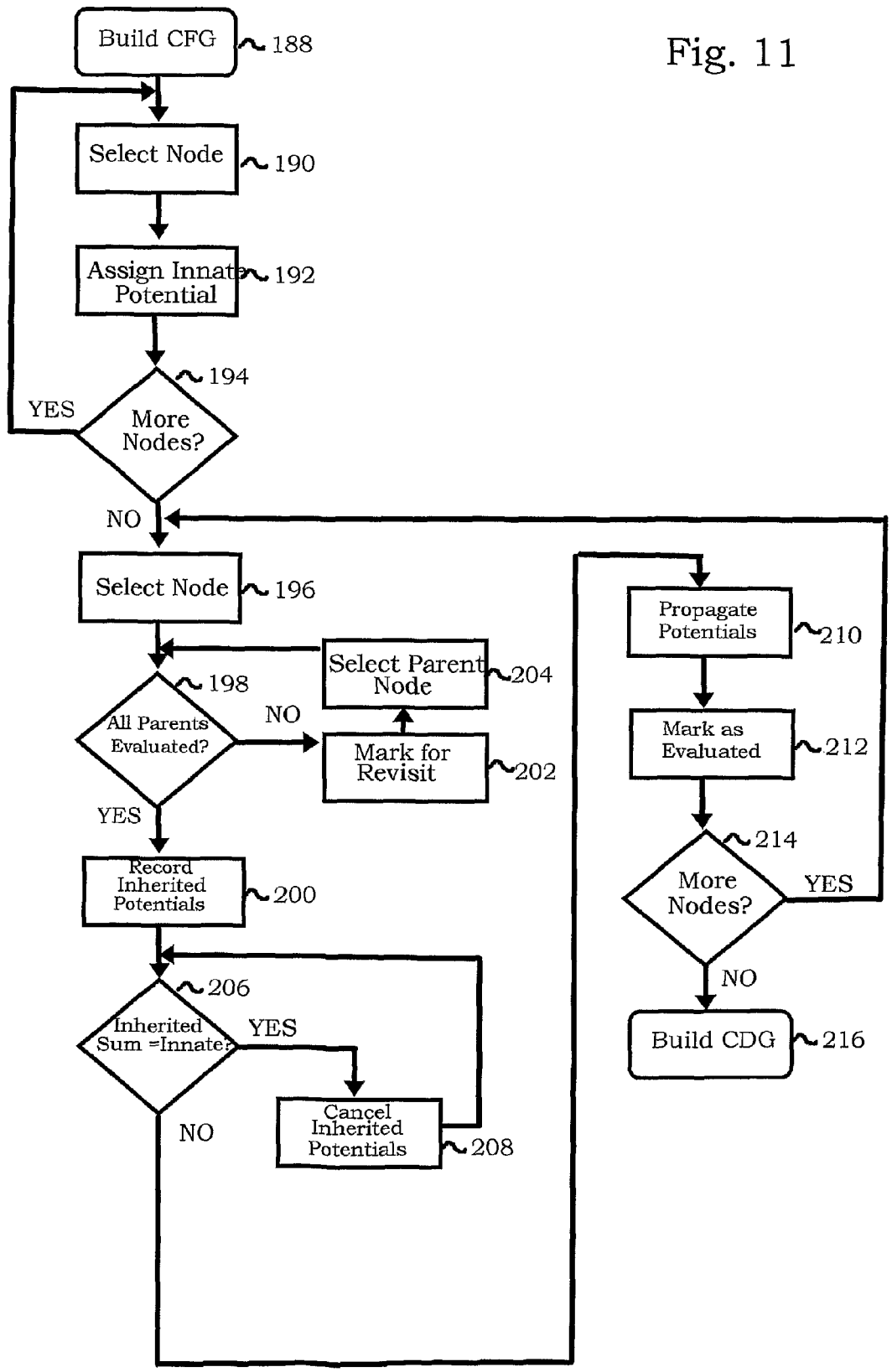
FIG. 11 is a flow chart of a method of establishing potentials in the nodes of a control flow graph for use in constructing a control dependence graph, in accordance with a disclosed embodiment of the invention.

Reference is now made to FIG. 11, which is a flow chart of a method of establishing potentials in the nodes of a control flow graph as a first phase of constructing a control dependence graph, in accordance with a disclosed embodiment of the invention.

The process steps that follow are shown in an exemplary order, but can often be performed in many different orders according to the implementation that may be chosen by those skilled in the art.

At initial step 188 source code is selected and a control flow graph prepared as described above. At step 190, a node is selected.

Next, at step 192 the current node is initialized. An innate potential is assigned to the current node. In the current embodiment, this has a value of 1.0. However, other values may be chosen, so long as it is possible to determine whether inherited potentials sum to the value of the innate potential.

Control now proceeds to decision step 194, where it is determined if more nodes remain to be initialized. If the determination at decision step 194 is affirmative, then control returns to step 190.

If the determination at decision step 194 is negative, then initialization of the nodes has been completed, and evaluation of their potentials begins. Control proceeds to step 196. An unevaluated node of the control flow graph is selected.

Control now proceeds to decision step 198, where it is determined if all parents of the current node have been evaluated. In the case of the root node, which has no parents, this determination is affirmative.

If the determination at decision step 198 is affirmative, then control proceeds to step 200, which is described below.

If the determination at decision step 198 is negative, then evaluation of the current node is deferred until all the parents have been evaluated. Control proceeds to step 202. The current node is marked for revisit. Then, at step 204 an unevaluated parent of the current node is selected, and control returns to decision step 198

Step 200 is performed if the determination at decision step 198 is affirmative. The magnitude and the node of origin of all inherited potentials are recorded. It is desirable to record the topological order of the nodes of origin, as this information may be required later.

Control now proceeds to decision step 206, where it is determined if any combination of the inherited potentials of the current node sum to the value of the innate potential.

If the determination at decision step 206 is affirmative, then control proceeds to step 208. The particular set of inherited potentials is deleted from the record that was prepared in decision step 198. Control returns to decision step 206 to repeat the test using the remaining inherited potentials.

If the determination at decision step 206 is negative, then control proceeds to step 210. All the potentials of the current node are divided for propagation to the child nodes in subsequent iterations in accordance with Rule 2.

Next, at step 212 the current node is marked has having been evaluated, so that will not be revisited.

Control now proceeds to decision step 214, where it is determined if unevaluated nodes remain. If the determination at decision step 214 is affirmative, then control returns to step 196 for selection of a new node.

If the determination at decision step 214 is affirmative, then control proceeds to final step 216. Here the nodal potentials of the control flow graph are employed to construct a control dependence graph. The details are given below.

Once the potentials of the nodes in the control flow graph have been established, a control dependence graph 218 can be constructed. The following rules apply to construction of control dependence graphs:

Rule 7. If a node has only innate potential, value 1.0, it depends on the entry node (e.g., node "Enter" in control dependence graph 218).

Rule 8. If a node has multiple inherited potentials from different source nodes, then it depends on the source node of the corresponding control flow graph that is closest in topological order to the current node.

Rule 9. If a node has a single inherited potential, then it depends from the source node of the inherited potential. Rule 9 is actually a trivial case of Rule 8.

Figure 12:
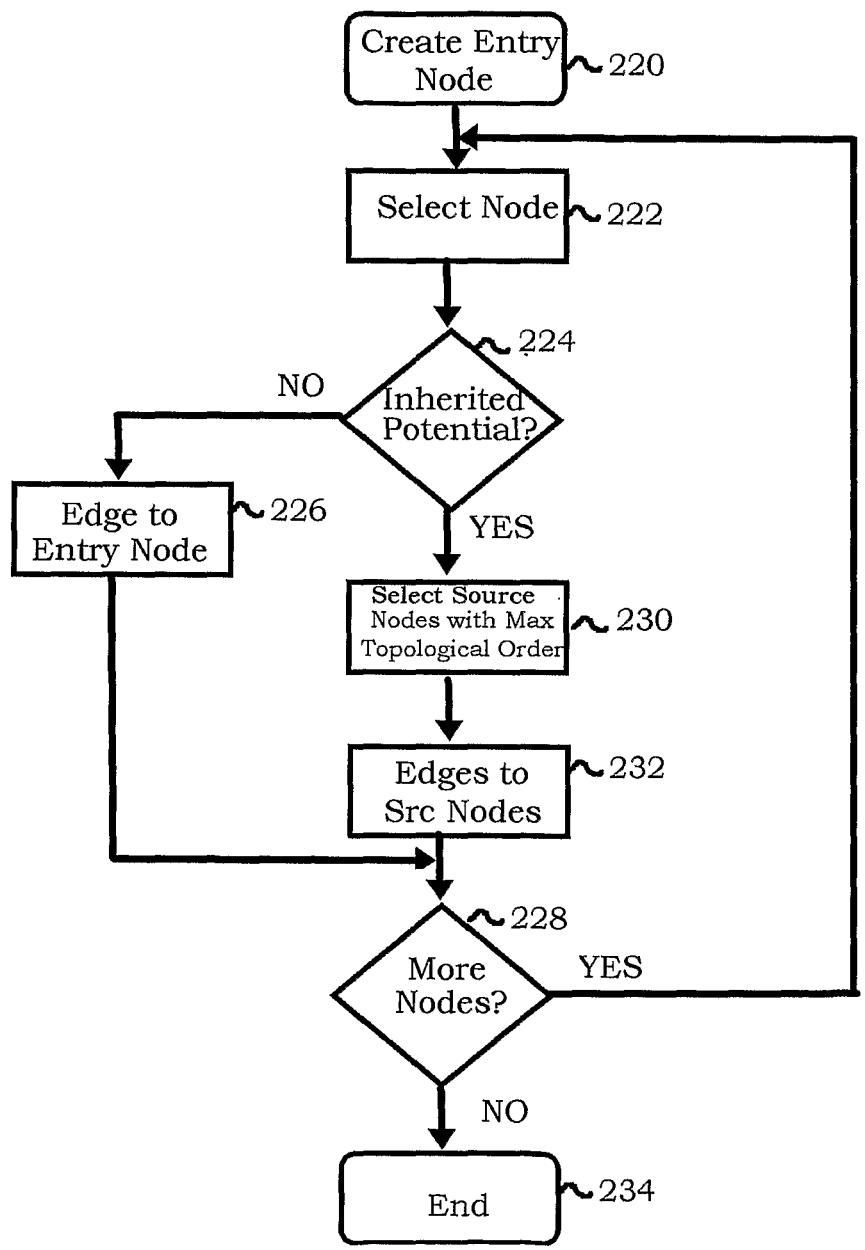
FIG. 12 is a flow chart illustrating further details of the method of FIG. 11, in accordance with a disclosed embodiment of the invention.

Reference is now made to FIG. 12, which is a flow chart illustrating further details of method of FIG. 11 for constructing a control dependence graph in accordance with a disclosed embodiment of the invention. It is assumed that the method described with reference to FIG. 11 has been performed. The steps described below are an expansion of final step 216 (FIG. 11).

At initial step 220 an entry node is established for the control dependence graph.

Next, at step 222 a node of the control flow graph is selected. A depth first traversal with respect to solved parent nodes traversal is suitable for traversing the control flow graph.

Control now proceeds to decision step 224, where it is determined if the current node has inherited potentials.

If the determination at decision step 224 is negative, then it is concluded that the current node only has innate potential and Rule 7 applies. The current node depends directly on the entry node. Control proceeds to step 226. An edge is established between the entry node and the current node. Control then proceeds to decision step 228, which is described below.

If the determination at decision step 224 is affirmative, then control proceeds to step 230. It will be recalled that in step 200 (FIG. 11), the source node of origin of each inherited potential was recorded. In step 221, the topological orders of the sources are compared and the source node or nodes having the topological order closest to that of the current node are selected.

If there is only one inherited potential, then Rule 9 applies. The source node from which the single inherited potential derives is selected. Otherwise, Rule 8 applies. If a plurality of source nodes share the closest topological order, then all such source nodes are selected.

Next, at step 232 edges are established between the source node or nodes that were selected in step 230 and the current node.

Control now proceeds to decision step 228, where it is determined if more nodes in the control flow graph need to be visited. If the determination at decision step 228 is affirmative, then control returns to step 222 for selection of a new node.

If the determination at decision step 228 is negative, then control proceeds to final step 234. The control dependence graph is now complete and the procedure ends.

EXAMPLE 4

Figure 13:
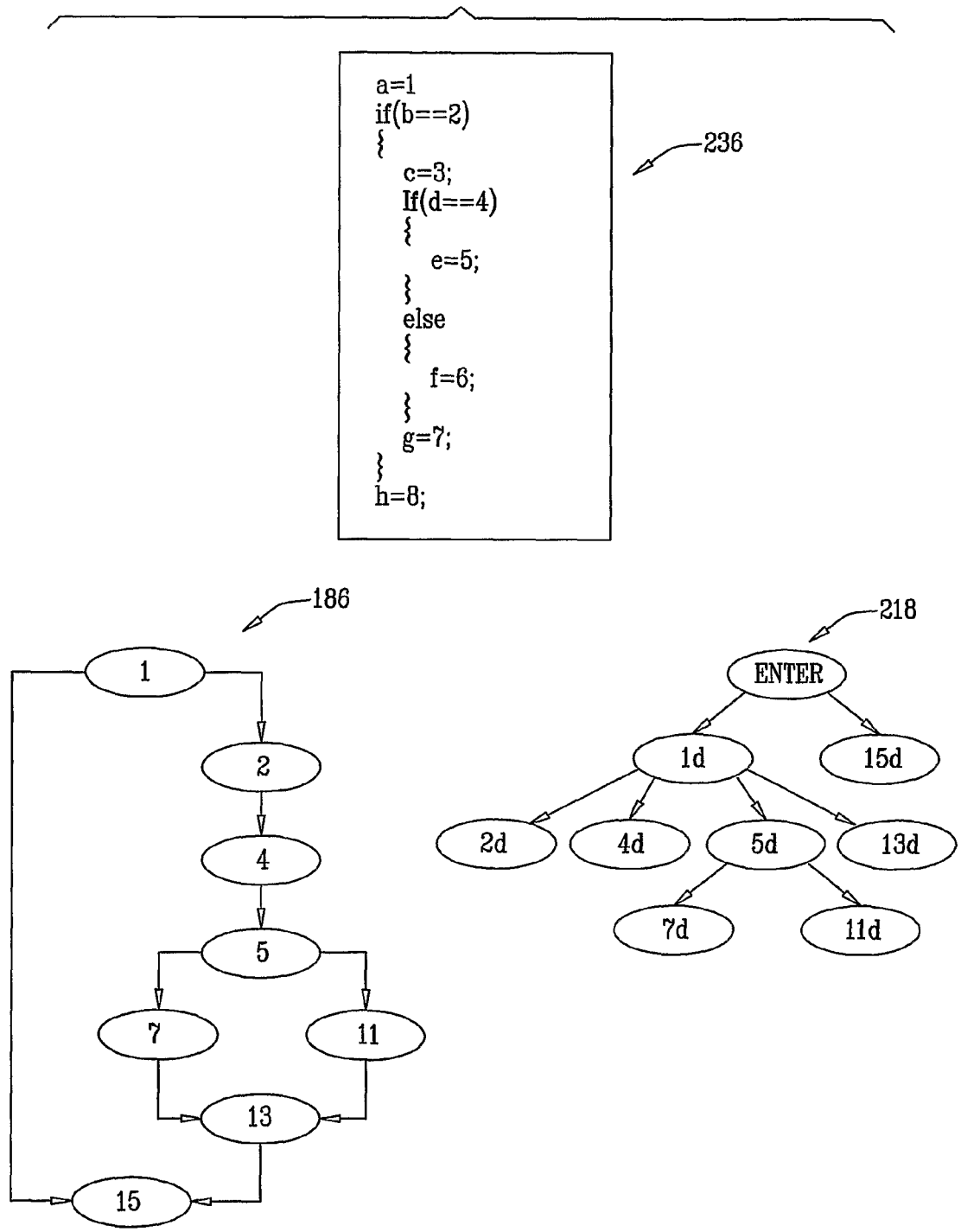
FIG. 13 is a composite diagram illustrating construction of a control dependence graph in accordance with the methods disclosed with reference to FIG. 11 and FIG. 12, in accordance with a disclosed embodiment of the invention.

Reference is now made to FIG. 13, which is a composite diagram illustrating construction of a control dependence graph in accordance with the methods disclosed with reference to FIG. 11 and FIG. 12, in accordance with a disclosed embodiment of the invention. Exemplary source code 236 maps to control flow graph 186. In the notation used for control, dependence graph 218 nodes are distinguished from their corresponding equivalents in the control flow graph 186 by a suffix "d".

The assignment of nodal potentials is now described with reference to the control flow graph 186.

Node 1 is visited first (step 1). It has no ancestors, and is assigned a potential value of 1.0 (Table 1, Row 1).

TABLE 1

| Row | Node | Source | Potential | Remarks |
|-----|------|--------|-----------|---------|
| 1 | 1 | 1 | 1 | |
| 2 | 2 | 1 | 0.5 | |
| 3 | | 2 | 1 | |
| 4 | 4 | 1 | 0.5 | |
| 5 | | 4 | 1 | |
| 6 | 5 | 1 | 0.5 | |
| 7 | | 5 | 1 | |
| 8 | 7 | 1 | 0.25 | |
| 9 | | 5 | 0.5 | |
| 10 | | 7 | 1 | |
| 11 | 11 | 1 | 0.25 | |
| 12 | | 5 | 0.5 | |
| 13 | | 11 | 1 | |
| 14 | 13 | 1 | 0.5 | |
| 15 | | 13 | 1 | |
| 16 | | 7 | 0.5 + 0.5 (canceled) | |
| 17 | 15 | 1 | 0.5 (canceled) | Rcvd directly from Node 1 |
| 18 | | 1 | 0.5 (canceled) | Rcvd via Node 13 |
| 19 | | 15 | 1 | |

Since node 1 has two children (node 2 and node 15), it divides its potential among them. Thus, in step 2, node 2 and node 15 each inherit a potential value of 0.5 from node 1. Node 15 is discussed below. Node 2 has inherited potential of 0.5 (Table 1, Row 2) and innate potential of 1.0 (Table 1, Row 3). Node 2 has one child node, node 4.

Now node 4 is considered. The two potentials derived from node 2 are treated separately. It will be recalled from the discussion of Rule 5 that node 4 inherits the innate potential of node 2, but since it equals one, it is canceled. This transaction is omitted from Table 1. Node 4 has received from node 2 an inherited potential of 0.5 derived its remote ancestor, node 1, (Table 1, row 4). Additionally, its has innate potential 1.0 (Table 1, row 5).

Node 4 propagates 100% of its inherited potential to node 5, its only child node (Table 1, row 6). Node 4 also has innate potential 1.0 (Table 1, row 7).

Node 5 has two children, nodes 7, 11, and distributes its potentials among them in accordance with Rule 2. Node 7 is described first. In a first transaction 50% of the inherited potential of node 5 (Table 1, Row 6), value 0.25 is propagated to node 7 (Table 1, Row 8). In a second transaction, 50% of the innate potential of node 5 (Table 1, Row 7), value 0.5 and deriving from node 1, is propagated to node 7 (Table 1, Row 9). Node 7 has an innate potential, value 1.0 (Table 1, Row 10).

Node 13 is now visited. The order of visitation of the nodes in the control flow graph 186 is not critical, and the particular order detailed herein is exemplary. However, it is apparent that the requisite information required from one of its parents, node 11, has not yet been determined. Node 13 cannot presently be evaluated, and is deferred.

Node 11 is now visited and evaluated. The details are identical to node 7 and are not repeated in the interest of brevity.

Node 13 is reconsidered. It receives identical distributions of first inherited potentials from node 7 (Table 1, Row 8) and node 11 (Table 1, Row 11), each value 0.25. Both of these are originally derived from node 1. They are combined for convenience in one row (Table 1, Row 14). Node 13 has innate potential, value 1.0 (Table 1, Row 15). In another transaction, node 13 also receives identical second inherited potentials from node 7 (Table 1, Row 9) and node 11 (Table 1, Row 12), each having value 0.5. The second inherited potentials are derived from their common parent, node 5. They total 1.0, and are therefore canceled in accordance with Rule 5 (Table 1, Row 16).

The last node to be considered is Row 15. In a first transaction, 50% of the innate potential of one of its parents, Row 1, value 0.5 (Table 1, Row 17). In a second transaction, inherited potential held in the other parent, node 13 (Table 1, Row 14), which also originated from Row 1, is propagated to node 15 (Table 1, Row 18). As the two inherited potentials of node 15 total 1.0, they are canceled in accordance with Rule 5. Node 15 is left with innate potential, value 1.0 (Table 1, Row 19).

Construction of the control dependence graph 218 is now described:

Node 1 only has innate potential, value 1.0. It is shown as Node 1d in the control dependence graph 218, and, in accordance with Rule 7, depends on node "Enter".

Node 2 has one inherited potential (Table 1, Row 2) deriving from Row 1. Consequently, node 2d depends on node 1d, in accordance with Rule 9.

Node 4 has one inherited potential (Table 1, Row 4) deriving from node 1. Consequently, node 4d also depends on node 1d.

Node 5 has one inherited potential (Table 1, Row 6). Therefore, node 5d also depends from node 1d.

Node 7 has two inherited potentials, (Table 1, Rows 8, 9), derived from node 1 and node 5. Rule 8 now applies. Referring to the control flow graph 186, node 5 has a greater topological order than node 1. Therefore, node 7d depends on Row 5. In like manner, node 11d depends from node 5d.

Node 13 has one remaining inherited potential (Table 1, Row 14), originating from Row 1. It may be noted that the cancellation of the two inherited potentials originating from node 7 (Table 1, Row 16) eliminates node 7 from consideration as a candidate for dependency. Node 13 therefore depends from node 1 in accordance with Rule 9.

Node 15 has only innate potential, value 1.0 (Table 1, Row 19), its inherited potentials (Table 1, Rows 17, 18) having been canceled. Node 15 therefore depends on node "Enter" in accordance with Rule 7.

In preparing the control flow graph 186 and the control dependence graph 218, each node is evaluated only once. Storing the solution in a table such as Table 1, e.g., a hash table, yields a total efficiency of O(n) where n is the number of nodes in the graph.

System Dependence Graphs

In order to follow data flow and control dependence through entire systems, the graphs are linked together. Referring again to FIG. 2, this process is performed in layer 58, using CDG+DFG module 60. A system dependence graph (SDG) can be regarded as a larger, application-encompassing control flow graph. The system dependence graph has the same properties as the control flow graph, except that instead of creating stubs as in the case of the CFG module 48, the CDG+DFG module 60 adds edges to the single method control flow graph of the called method. As a method may be called more than once, codes are associated with invocations and returns, e.g., color properties. These are expedient to direct invocations and returns in the graph in a desired order. The term "color" used herein is arbitrary to indicate an index to a particular invocation or return. Such codes may be implemented in many ways. Indeed, the graphs are generally not actually displayed, except for purposes of explication. In cases of polymorphism, all possible paths are constructed.

In order to follow data flow and control dependence through an entire application, it is necessary link single method graphs. In the case of a control dependence graph, a link is established between the invoking node of the calling method to the entrance node of method being invoked. This implies that every source code statement in the invoked method has a control dependence on invoking statement.

Data flow graphs are more complicated, especially when using object-oriented languages. Three issues need to be confronted:

First, in object-oriented languages, parameters may contain several datamembers, each of which may itself recursively incorporate other data members. In order to trace data flow it is necessary to treat with each data member and component individually. In practice, a simple function that receives a single parameter may require an expansion of the data structure, so that many parameters may be processed in the data flow graphs.

Second, in object-oriented languages, a "THIS" object exists, which refers to the object that is currently active. Information concerning the "this" object has to flow between method invocations to correctly describe data flow. The issue is resolved by treating the "this" object as the first parameter to each called method.

Third, global variables present another complication, as they can be accessed from virtually everywhere in the application. This is an exception to the hierarchical behavior of object-oriented programming. It is dealt with by defining a "super-global" variable that passes as a parameter to all methods, Global variables are assigned as data members of the super-global variable. When the super-global variable is expanded along with other parameters, the global variables therein are also passed to the called method.

Listing 5 illustrates handling of all three issues. At first, it seems that only one parameter is passed to the function func( ):

Public void func(myClass ins).

First, the THIS object and Super-Global variable are added. Now the functions appears as follows:

Public void func(THIS, SuperGlobal, myClass ins).

Second, the data members of each parameter are expanded. The THIS object contains one data-member (var3), The Super-Global variable contains one data-member (Session ["Hello"]) and "ins" has two data members (var1, var2). After expansion, the function appears as follows:

Public void func(THIS,THIS.VAR3, SuperGlobal,
SuperGlobal.Session-Hello, myClass ins, ins.var1, ins.var2).

Figure 14:
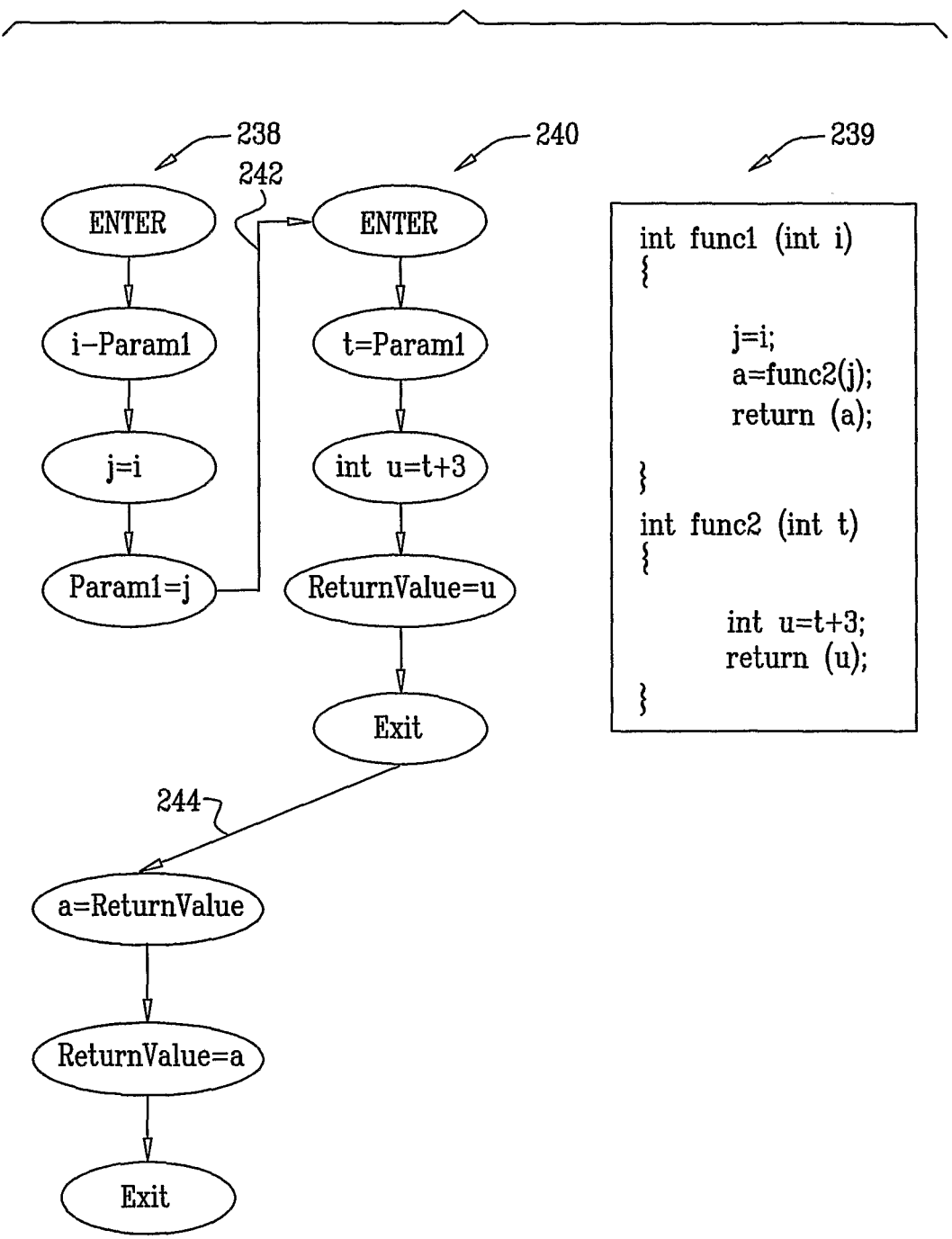
FIG. 14 diagrammatically illustrates stub replacement in a control flow graph, in accordance with a disclosed embodiment of the invention.

Reference is now made to FIG. 14, which diagrammatically illustrates stub replacement in a control flow graph, in accordance with a disclosed embodiment of the invention, based on source code 239. After expanding the parameters, relevant nodes of one single method control flow graph are linked to the prolog of another single method control flow graph. A similar link is established from the epilog to return values. In FIG. 14, the calling function, func 1 ( ) is shown as a column of nodes 238 on the left, and the invoked function, func 2 ( ) as a column of nodes 240 on the right. Edges 242, 244 link the functions at the points of invocation and return, respectively. As noted above, colors of such links are assigned by the CDG+DFG module 60 (FIG. 2) for convenience of the operator. The linking process may be iterated to create large, application-encompassing graphs, such as a system dependence graph.

DOM Operations.

It is desirable to store the document object model can be stored in an object-oriented database. Suitable databases for this purpose include the model db4o, available from db4objects, Inc. 1900 South Norfolk Street, Suite 350, San Mateo, Calif., 94403 and the Versant™ Object Database, available from Versant Corporation, 255 Shoreline Drive, Suite 450, Redwood City, Calif. 94065.

Advantages of this approach include rapid storage and retrieval of the document object model, thereby avoiding need for its recalculation. Database storage enables querying the source code for static characteristics, e.g., using query languages such as OQL. Furthermore, automatic updating of code can sometimes be accomplished with the aid of an object database.

Referring again to FIG. 2, layer 62 includes the object oriented database 64. Listing 6 illustrates the process of storage and retrieval using the database 64. Listing 7 is an example of manipulating the document object model, in which public data members are changed to private data members.

Code Graph Querying

The preceding description concerns development of raw information about the source code. In order to transform the information into workable knowledge, some data mining is required. There are two ways to fulfill this requirement:

The first method is to use hard-coded customized functions. Once developed, such functions are easy to use, but they are inflexible, and difficult to adapt to particular applications or local user requirements.

Alternatively, one can employ a query language. This language is flexible enough to retrieve any static and dynamic knowledge from the data that might be needed. However, to be used effectively scripting skills are required on the part of the user.

The SCA engine 22 employs a query language that has been extended by specialized built-in functions. This has all the advantages of both methods—it is easy to use on one hand, and highly configurable on the other. An expert user can tailor the queries to his specific needs, or even write queries from scratch, whereas a novice has only to "point and click".

The scripts developed by the query language can be used in order to perform code slicing, either syntax preserving or semantic preserving. Program slicing is a technique for aiding debugging and program comprehension by reducing complexity. The essence of program slicing is to remove statements from a program that do not affect the values of variables at a point of interest. Program slicing is a technique well known in the art.

EXAMPLE 5

This example displays code slicing using the following code fragment of Listing 8. It is desired to learn what influences the Write statement in line 4. The code is analyzed or "backward sliced", preserving syntax. The "slice" is computed by working backwards from the point of interest finding all statements that can affect the specified variables at the point of interest and discarding the other statements. In slicing using "syntax preserving", the syntax of the original program is largely untouched. Irrelevant statements are simply removed to create a program slice.

The statements "a++" (line 3) and "a=3" (line 1) are obviously relevant. The resulting slice is shown in Listing 9, in which omitted code is indicated by a dashed line. However, the result does not compile correctly. In line 3 of Listing 9, the value of variable "b" is set, but variable b is never declared. This fragment illustrates a drawback of using pure syntactic preserving slicing: a statement may contain a mixture of relevant and irrelevant expressions, in which case the result does not compile.

A solution is to use a known technique known as "semantic preserving slicing", in which only semantics-preserving transformations are allowed. This is achieved by splitting blocks in the control flow graph into atomic elements, which represent a single action. Applying this technique results in the code fragment of Listing 10.

The query language of the current embodiment contains the commands shown in Table 2, in which X and Y are arrays of objects.

TABLE 2

| | |
|---|---|
| X.DataInfluencedBy(Y) | All object of X that are data influenced by objects from Y. |
| Y.DataInfluencingOn(X) | All object of Y that are data influencing on objects from X. |
| X.ControlInfluencedBy(Y) | All object of X that are control influenced by objects from Y. |
| Y.ControlInfluencingOn(X) | All object of Y that are control influencing on objects from X. |
| X.InfluencedBy(Y) | All objects of X that are influenced by objects from Y (either data or control). |
| Y.InfluencingOn(X) | All objects of Y that are influencing on objects from X (either data or control). |
| X.ExecutesBefore(Y) | All object of X that are executed before any of the objects in Y. |
| Y.ExecutesAfter(X) | All object of Y that are executed after any of the objects of X. |
| X.FindByID(n) | All objects of X that their id is n (id is a unique identifier each object in the system has. This implies that the returned array may contain one object at most). |
| X.FindByName(s) | All objects of X that are their name is/contains s (supports wildcards). |
| X.FindByLocation(loc) | All objects of X that are located in the specifed location (line, row). |
| X.FindByType(typeof(t)) | All objects of X that their DOM object is of type t (For example, find all field declarations). |
| X.FindByType(t) | All objects of X that are of type t (For example, find all int variables). |
| X.FindByQuery(q) | All objects of X that match specific query (see section 10 above). |
| X − Y | All objects of X that are not in Y. |
| X + Y | All objects of X together with all the objects in Y. |
| X * Y | All objects of X that are also in Y. |

TABLE 2-continued

| | |
|---|---|
| X / Y | All objects of X that are not in Y together with all objects of Y that are not in X. |
| X.DataInfluencedByAndNotSanitized(Y, Z) | All objects of X that are data influenced by Y, and there is a path between Y and X that doesn't go through Z (see section 15 below). |
| All.DirectlyDataInfluencingOn(X) | The objects that directly affect the value of any of the objects in X. |
| All.DirectlyDataInfluencedBy(X) | The objects that are directly affected by the value of the object in X. |
| Chopping | Notice that chopping is exactly like InfluencedBy*InfluencingOn |
| All.InfluenceByAndNotSanitized(X,Y) | The objects that are affected by X, in a path that doesn't contain Y. |
| All.CallingMethodOfAny (X) | Objects calling to one of these methods. |
| All.GetClass (X) | Get the class containing object X. |
| All.GetByClass (X) | Get all objects contained in class X. |
| All.FindByMemberAccess (string) | Find all access to the specified member. |
| All.FindByAssignmentSide(AssignmentSide) | Find all objects on the specified side of an assignment expression. |

Using the commands in Table 2, any type of dependence (data, control) or execution (control flow), in any order (By, On) can be calculated easily.

EXAMPLE 6

The following query, using the commands shown in Table 2, reveals the effect on an application of changing a Boolean value from true to false:

Result = All.InfluencedBy (All.FindByName ("namespace1.class1.bool1")).

In order to find all locations where data is influenced by variable A or variable B, but not both, use the following query:

Result = All.DataInfluencedBy (A) / All.DataInfluencedBy (B);

In order to find all locations that influence object #3 and are influenced by object #5, queries can be chained:

Result = All.InfluencingOn(All.FindByID(3)).InfluencedBy (All.FindByID(5)).

Query Implementation.

Much of the computational effort in servicing queries involves searching for specific objects in large graphs. Various methods are employed to service the query, particularly those listed in Table 2. These methods generally involve searches for different types of objects. A common search method returns the forward/backward closure from a specified location. Each method involved in a particular query then parses the closure results. In order to avoid infinite loops visiting the same node more than once, unless distinguished by a different color property, as explained above.

Figure 15:
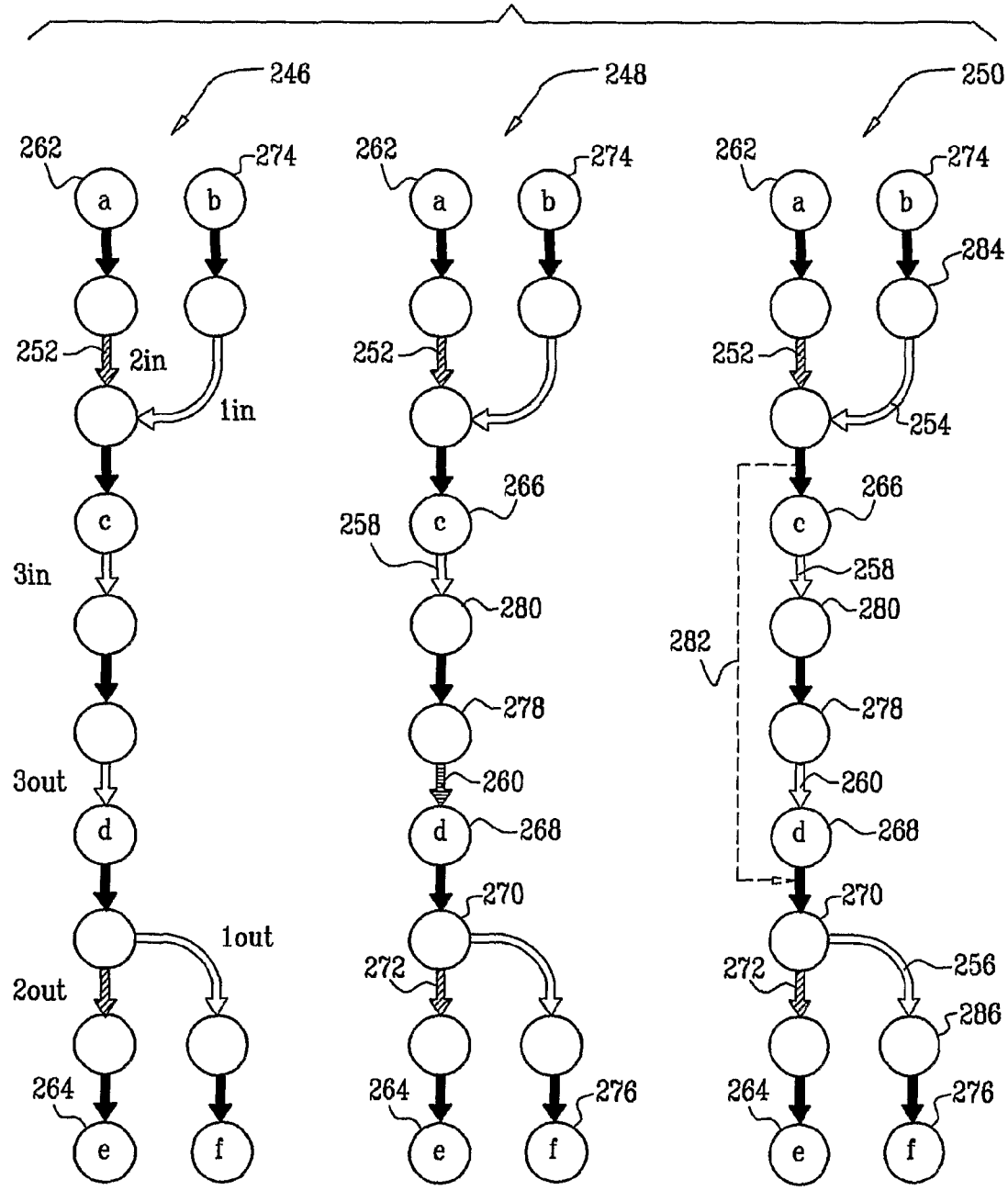
FIG. 15 is a series of control dependence graphs illustrating closure computation, in accordance with a disclosed embodiment of the invention.

Reference is now made to FIG. 15, which are exemplary control dependence graphs 246, 248, 250, illustrating use of a "leapfrog" closure computation" algorithm, in accordance with a disclosed embodiment of the invention.

In FIG. 15, as best seen on the graph 250, edges 252, 272 (red) edges 254, 256 (green) are given distinctive properties because they show invocations and returns to and from functions. Edges 258, 260 (blue) are given color properties for the same reason.

The traversals are marked or "painted" according to the following rules:

Rule 10. A graph is initially unmarked.

Rule 11. An unmarked section of a graph may be marked or "painted", denoting that that a stub has been replaced by a section leading to and from the source code of a function.

Rule 12. A marked section of a graph may be skipped in a subsequent traversal.

It is sufficient to only mark or paint boundary portions of the respective sections, it being assumed that intermediate portions are also marked. In stack-based implementations, such boundary markings correlate with push and pop operations.

Referring first to graph 246, a first traversal during a search operation or closure computation follows a path from node 262 (a) to node 264 (e). Most of the graph is shown unmarked. However, during a first traversal node 262 has been reached. Node 262 is an entry point to some function in the source code. Edge 252 has been painted "red" in accordance with Rule 11. In preparation for marking a matched section when a return from the function occurs, a property "red" is pushed onto a stack.

Referring next to graph 248, the traversal passes through a section bounded by node 266 and node 268. These nodes indicate invocation and return from another function. At node 266, a property "blue" is pushed onto the stack.

Upon exiting node 268 the property blue is popped from the stack, correlating with the blue coloration of edge 260 and node 268. Now the property "red" is again at the top of the stack.

At a branch at node 270, at which point a return from the first function occurs, edge 272 is painted red. The property "red" is popped from the stack. The traversal of path leading from node 262 to node 264 (e) is then completed uneventfully.

Eventually a second traversal a path leading from node 274 (b) to node 276 (f). At edge 254, which is initially unmarked in accordance with Rule 10, the first function is invoked again, from a different location, and the property "green" is pushed onto the stack. The property green is pushed onto the stack. The treatment is the same as for edge 252, discussed above, but the properties of edge 254 and edge 252 are distinguishable.

Now the traversal reaches node 266. However, the record of a previous traversal through node 266, edge 258, node 278, and node 280 a call to the second function is again recognized. All computations associated with the call and return to the second function are known, and the segment is skipped in accordance with Rule 12, as indicated by a broken line 282.

Such "contractions" of the graph enable a subsequent traversal of a path to skip or leapfrog previously marked sections of the graph, possibly representing large sections of code. A contraction between nodes 266, 268 is established, including nodes 280, 278 and their incoming and outgoing edges. Now, when it is attempted to traverse the graph a second time, following a path between node 274 to node 276, the section delineated by edges having the property "blue" is skipped, and is not seen. As this section already appears in the closure, no information is missed. Rather, the computation is accelerated by avoiding sections of code in the leapfrog operation. The second traversal follows broken line 282.

Upon exiting node 270, corresponding to a return from the second invocation of the first function, the property "green" is popped from the stack, and edge 256 painted green. Should a subsequent traversal (not shown) involve a path leading through edges 254, 256, another contraction, denoted by nodes 284, 286 would be executed, which would be even larger than the contraction denoted by line 282.

Vulnerability Queries.

Referring again to FIG. 2, layers of the SCA engine 22 described above provide an infrastructure for code querying. The following sections describe application of these layers for detection of code vulnerabilities.

The following vulnerabilities and issues can be detected, as well as others not listed: unvalidated input; persistent attack; least privilege; logical flaws; pages without graphical user interface (GUI) access; display of confidential information; I/O from virtual directory; data validation issues; broken access control; protection methodology; and source sensitive wizard.

Unvalidated Input.

Unvalidated input points provide attackers with entry points to an application. Application without entry points, that does not receive any input from users, is not likely to be attacked. Input validation is used to verify that input entered from the user complies with predetermined rules, an issue that software developers sometimes ignore or fail to implement properly.

The SCA engine 22 (FIG. 2) uses data flow graphs to locate input sites lacking validation. For this purpose, nodes of the data flow graph are assigned to one of three categories, denoted as [1], [2], [3]. Entry points in the application are assigned to category [1]. Such points potentially contain unsafe input. Category [2] corresponds to input validation functions, which typically sanitize input data. Category [3] applies to places where the data is consumed. It is at the places classified as category [3] that the SCA engine 22 verifies that only acceptable data is processed.

Figure 16:
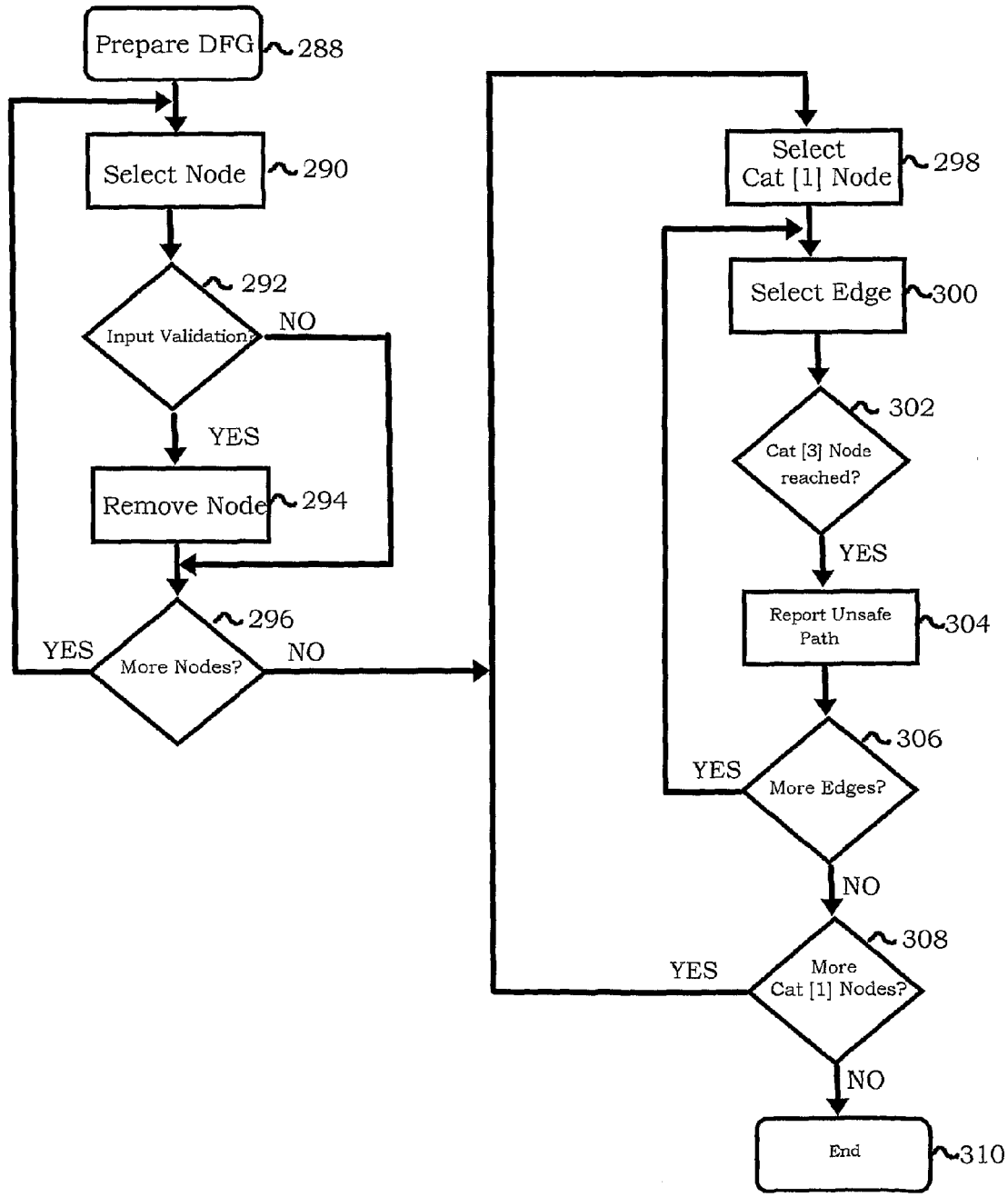
FIG. 16 is a flow chart of a method for identifying a possibility of unvalidated input in a computer program, in accordance with a disclosed embodiment of the invention.

Reference is now made to FIG. 16, which is a flow chart of a method for identifying a possibility of unvalidated input in a computer program, in accordance with a disclosed embodiment of the invention. The method shown below involves closure of a flow graph follow removal of some nodes. Applying closure in this manner increases the efficiency of graph traversals, in that conditional statements need not be evaluated. At initial step 288, a data flow graph is prepared, for example as described above with reference to FIG. 8. A traversal of the graph is now begun, applying the "leapfrog" method described above.

At step 290, a node is selected and categorized as described above.

Control now proceeds to decision step 292, where it is determined if the current node represents an input validation function (category [2]).

If the determination at decision step 292 is affirmative, then control proceeds to step 294. The current node and its incoming and outgoing edges are removed from the data flow graph.

After performing step 294, or if the determination at decision step 292 is negative, control proceeds to decision step 296, where it is determined if there are more nodes to be processed in the data flow graph. If the determination at decision step 296 is negative, then control returns to step 290.

If the determination at step 294 is negative, then the first phase of the procedure has been completed. Only nodes categorized [1] or [3] remain in the data flow graph.

Control proceeds to step 298. A node of category [1] is selected.

Next, at step 300 an edge leading away from the current node is chosen.

Control now proceeds to decision step 302, where it is determined if the current edge extends to a node where input is used (category [3]). If the determination at decision step 302 is affirmative, then control proceeds to step 304. The current path is classified as unsafe.

After performing step 304, or if the determination at decision step 302 is negative, then control proceeds to decision step 306, where it is determined if there are more edges leading from the current node.

If the determination at decision step 306 is affirmative, then control returns to step 300.

If the determination at decision step 306 is negative, then control proceeds to decision step 308, where it is determined if there are more category [1] nodes in the data flow graph. If the determination at decision step 308 is affirmative, then control returns to step 298, where a new node is chosen.

If the determination at decision step 308 is negative, then the data flow graph has been fully evaluated. Control proceeds to final step 310, and the procedure ends.

In an alternate implementation of the method, nodes of category [3] may be selected at step 298 and connections between category [1] nodes and category [3] nodes determined by evaluating edges leading into the category [3] nodes.

EXAMPLE 7

Figure 17:
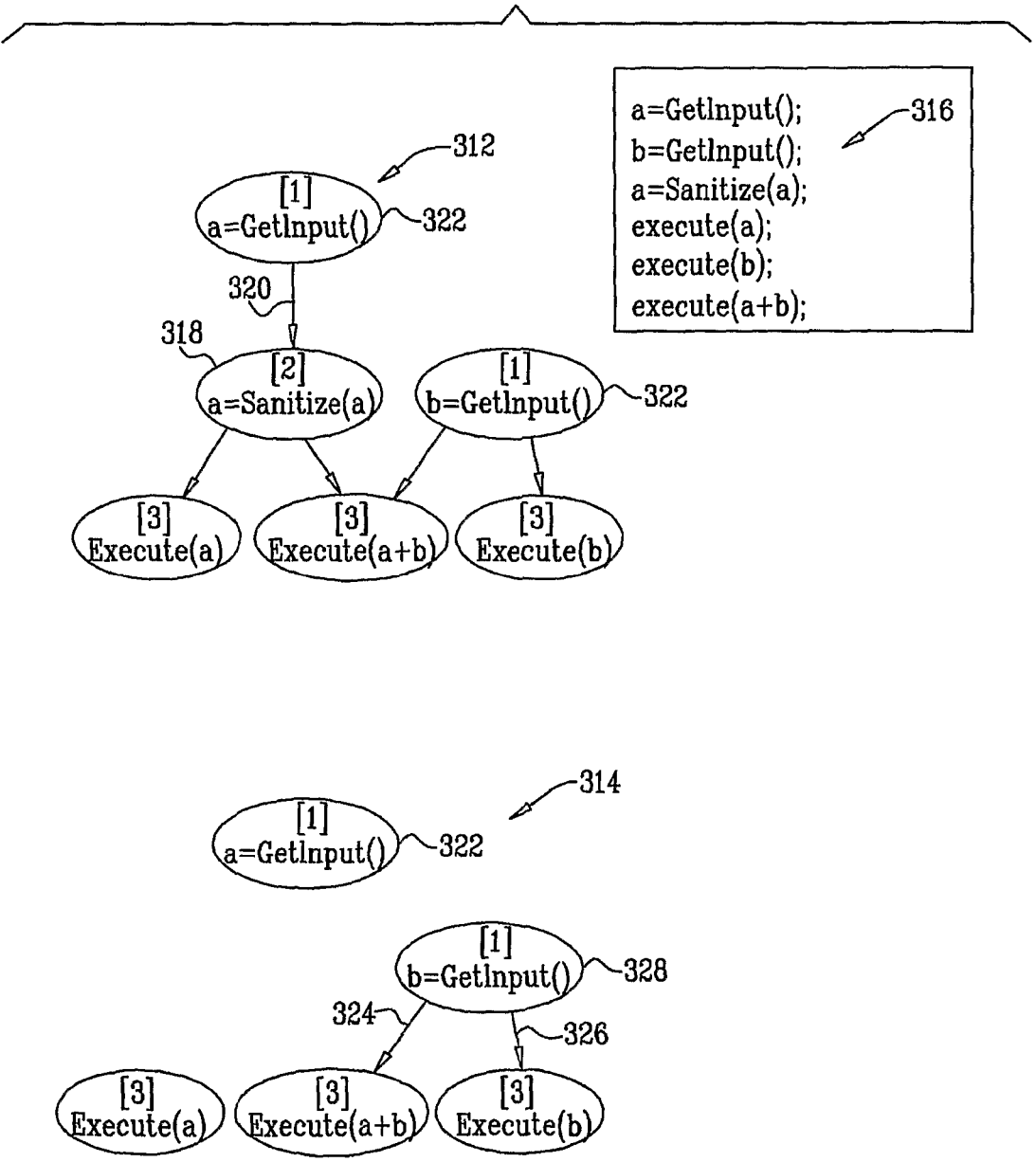
FIG. 17 diagrammatically illustrates processing of data flow graphs to determine unvalidated input vulnerabilities in accordance with a disclosed embodiment of the invention.

Reference is now made to FIG. 17, which illustrate processing of data flow graphs to determine unvalidated input vulnerabilities in accordance with a disclosed embodiment of the invention. Data flow graphs 312, 314 correspond to code 316. Nodes of categories [1], [2], [3] are shown.

When the method of FIG. 16 is performed, category [2] node 318 is discovered, and removed, as shown in graph 314. In graph 312, edge 320 connects category [1] node 322 to node 318. In graph 314 it is apparent that edge 320 ends blindly.

When the sequence beginning with step 298 (FIG. 16) is performed, edges 324, 326 are found to connect category [1] node 328 with category [3] nodes, and are therefore reported as unsafe. Edge 320 is not reported as being unsafe. It is concluded that category [1] node 328 constitutes a security vulnerability. As shown in Table 3, modifications of this technique allow vulnerabilities involving several types of injections to be discovered. Table 3 illustrates categorization of node types relating to respective forms of injection.

TABLE 3

| Type | [1] | [2] | [3] |
|---|---|---|---|
| SQL Injection | Interactive inputs | Sanitization function (e.g., prepared statements) | DB access commands |
| Cross site scripting | Interactive inputs | Sanitization function (Eg. HTMLEncode) | Web screen output |
| Command Injection | Interactive inputs | Sanitization function (e.g., removing meta-characters) | Operating system direct access commands |
| LDAP Injection | Interactive inputs | Sanitization function (e.g., removing LDAP meta-characters) | LDAP access command |
| Reflection injection | Interactive inputs | Sanitization function (e.g., global variables removal) | Reflection commands |
| Path manipulation | Interactive inputs | Sanitization function (e.g., path meta-characters removal) | File access commands |

Persistent Attacks.

Persistent attacks occur in two stages. In the first stage stores a dangerous payload on the server. The second stage, typically deferred, causes the payload to execute. Deferral of the effect makes it very difficult to locate the vulnerability manually. The method described with respect to FIG. 16 and FIG. 17 is capable of finding such vulnerabilities when modified by categorizing storage functions (instead of entry points) as category [1].

By modifications that will be evident to those skilled in the art, by retrieving data directly from a database instead of dealing with interactive inputs as in the discussion of unvalidated input, the method is capable of detecting the following vulnerabilities: Second order SQL Injection; persistent SQL Injection; intersystem attacks; and persistent cross-site scripting attacks (XSS attacks).

EXAMPLE 8

Consider the code fragment of Listing 11. The code queries a database for the name of the person with an id of 3. Then, in a second query, it obtains his rank based on the retrieved name. Even if the name was sanitized before it was written to the database, e.g., by enclosure in double quotes, a single quoted name, e.g., ("O'Brian") will be retrieved from the database. Depending on the nature of the application, and the manner in which the stored data is rendered or executed, the second query is subject to a form of attack, which is sometimes referred to as "Second Order SQL Injection".

Least Privilege.

Least privilege is a well-known term in IT security. The idea behind it is that an entity, whether a user, an application or a service, should have only the privileges needed to make it work correctly, and nothing more. Although the idea is simple, its implementation is labor intensive. This difficulty is alleviated by using the query language described above with reference to Table 2 to identify privileges and automatically create a configuration file that specifies such privileges.

Scanning the code and denying access to program objects to which access is not needed by the application or by its authorized users prevents unauthorized use as well.

EXAMPLE 9

The following statement is an entry in a least privilege configuration file, which removes access permissions to the "xp.cmdshell" stored procedure. Such access permissions constitute a vulnerability that may allow remote access to database servers.

```
If (!Code.Execute(SQLStoredProcedure("xp..cmdshell")))
    SQLScript.Add(RemovePermissions("xp..cmdshell")
```

The above query creates a .SQL configuration file, containing the content exec sp_dropextendedproc 'xp_cmdshell'.

This removes the stored procedure xp.cmdshell.

Least Privilege.

The well known file system NTFS (NT File System) allows permissions to be defined for specific files and folders. By querying the code, using the above described query language, it is possible to learn which files and folders are accessed by the application, and what kind of access is needed. Anything else can be denied. The SCA engine 22 (FIG. 2) presents a dialog box that allows an operator to manually configure permissions. The same approach can be applied to file systems other than NTFS.

Logical Flaws.

Logical flaws are unique to a specific application. These are coding errors that do not comply with the application's specification. Such flaws can be detected using the above-described query language combined with the SCA engine 22 (FIG. 2).

This technique exposes many types of vulnerabilities that stem from logical flaws, for example flaws that violate the business logic as specified for the application. One obvious example is the display of confidential information, such as passwords, credit card numbers, and social security numbers. Other examples include forgotten debugging code, orders with negative quantity, and backdoors.

EXAMPLE 10

The following statement is a query that was executed on an open-source bookstore, in order to find a logical vulnerabilities wherein an user lacking administrative privileges is allowed to see another user's orders, although he is not the administrator:

```
Result = FindPlacesWhere(OrdersRetrievedFromDB &&
    pagePermission != Administrator &&
    dataNotInfluencedBy(userId).
```

Pages Without GUI Access.

Pages that are accessible from the Internet, but can not be accessed from the UI usually mean there was use of the "security by obscurity" technique, that is secrecy of design or, implementation to provide security. This approach admits that an application may have security vulnerabilities, but relies on the belief that the flaws are not known, and that attackers are therefore unlikely to find them. Identification of this disfavored approach alerts the operator that the application may indeed have latent security vulnerabilities and indicates the need for particular scrutiny

EXAMPLE 11

The following query detects a vulnerability of the above-described type:
 FindAllPages—FindUIPageAccessCommand.AccessedPage.
Display of Confidential Information.

Some variables should always be retrieved from the user, and never displayed, e.g., passwords, credit card numbers. In one vulnerability, "hidden" fields on a web page are displayable using a browser's "view source" option.

EXAMPLE 12

The following query detects a vulnerability that would permit display of confidential information:
 All.FindSensitiveVariables( ).DataInfluencingOn(Find_Outputs( )).
I/O From Virtual Directory.

I/O operations applied to a virtual directory may expose data, since a virtual directory, unless configured otherwise, is likely to enable read operations by all users.

EXAMPLE 13

The following query detects this vulnerability:
 Find_File_Access( ).NotDataInfluencedBy(AbsolutePath.
Data Validation Functions.

Data validation functions are well known in the art. Despite their availability, a programmer may develop a proprietary input validation function. The SCA engine 22 (FIG. 2) employs the software fault tree analysis (SFTA), a known technique. SFTA is discussed, for example, in the document *A Software Fault Tree Approach to Requirements Analysis of an Intrusion Detection System*, Guy Helmer et al. (2001), which was published on the Internet.

Referring again to FIG. 2, SFTA engine 68 in layer 66 verifies the competence of data validation functions that may be found in the code.

Figure 18:
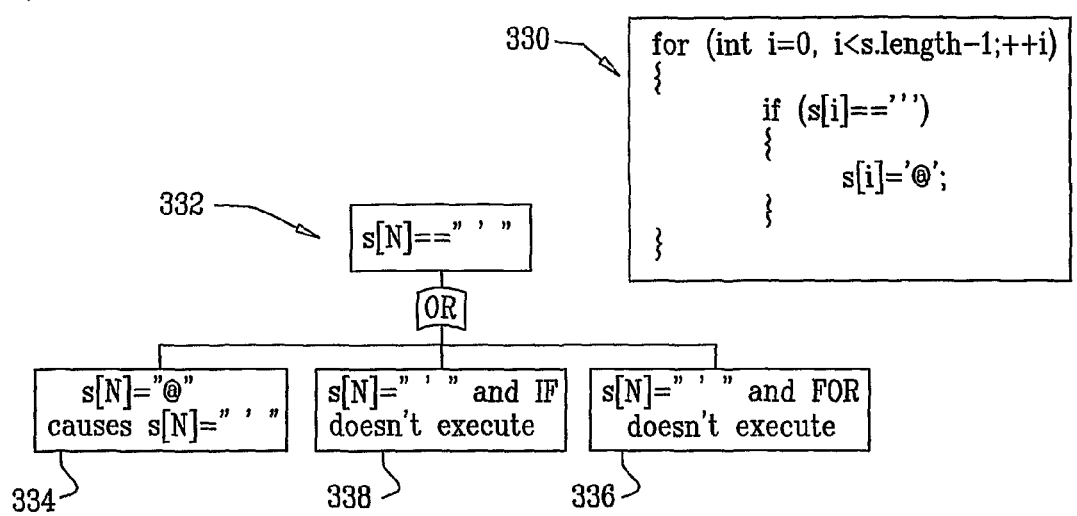
FIG. 18 diagrammatically illustrates processing of an exemplary proprietary data validation function in accordance with a disclosed embodiment of the invention.
Figure 18:
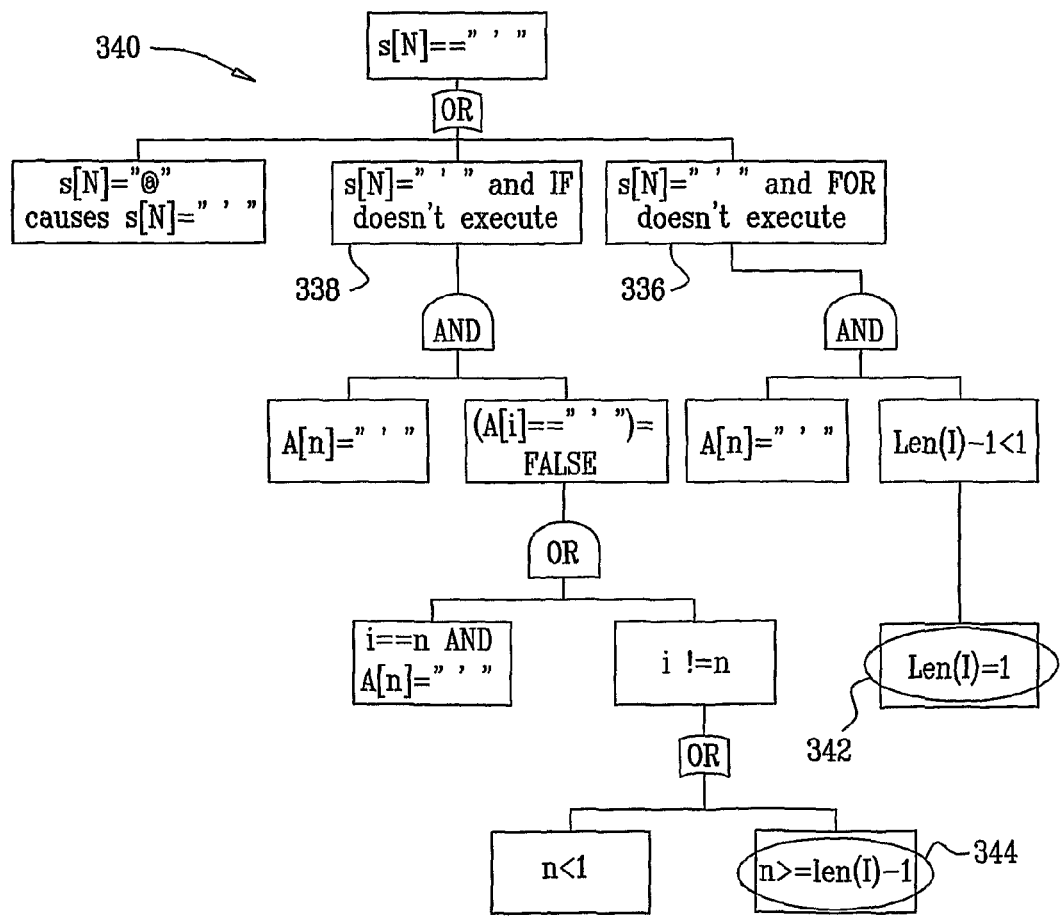

Reference is now made to FIG. 18, which is a diagrammatically illustrates processing of an exemplary proprietary data validation function in accordance with a disclosed embodiment of the invention. This occurs in the layer 66 (FIG. 2). The function, shown as source code 330 is intended to replace occurrences of the character "'" in a string s. Source code 330 contains a "for" loop, an "if" block, and an assignment statement.

Assume that prior to executing the source code, the string s contains an apostrophe in its Nth position. It is desired to determine if the apostrophe remains after completion of the for loop in the source code 330. We start by observing that there are three possible paths through the code:
 1. The program does not enter the "for" loop.
 2. The program enters the "for" loop but for some reason the "if" statement never evaluates as "true".
 3. The program enters both the "for" loop and the "if" block, but the assignment expression leaves the apostrophe in place.

These possibilities are shown in a graph 332. The third possibility, indicated by block 334 in the graph 332 is impossible and need not be considered further for purposes of the SCA engine 22.

Consider the option shown in block 336, corresponding to the first possible path. The "for" loop does not execute if (s.length−1)<1), or equivalently, if the length of string s is less than 2. In case "s" is a single-character string that contains only an apostrophe, the function will fail.

The second possible path is represented by block 338. Although the "for" loop has been entered, the "if" statement always return "false", even though the string contains an apostrophe at the Nth position. This will happen only if "i" never reaches "N", which occurs if N<0 or (N>=s.length−1). In other words, the function will fail if an apostrophe occurs at the end of a string that exceeds one character in length.

The entire process is shown in a composite graph 340, in which two flaws 342, 344 are circled.
Automatic Unit Testing.

Referring again to FIG. 2, by inserting a data validation function, for example the function shown in FIG. 17, into the unit testing engine 72 in layer 70 and testing it automatically, scenarios may be identified in which the data validation functions fails. Using a conventional test generator a function to be evaluated is embedded into a test application, test cases generate. When the test application executes, the outputs are presented to a validation engine, and the results can indicate a security vulnerability.
Broken Access Control.

In this vulnerability, restrictions on what authenticated users are allowed to do are not properly enforced. For example, attackers can exploit such vulnerabilities to access other user accounts, view sensitive files, or use unauthorized functions. In locating such vulnerabilities, queries can be designed, using the above-described query language, to locate pages that are called only when compliance with certain criteria are required, e.g., user authorization, but which are not checked during user interactions with such pages.

EXAMPLE 14

In this example, a page named "/admin" is called only when variable IsAdmin =1. However, the page itself does not check for that condition, and explicitly calling it will result in broken access control. The query found in the procedure shown in Listing 12 detects the vulnerability.
Automatic Discovery of Protection Methodology.

Some of the queries mentioned above require the user to supply some information about the application, e.g., what function is used to sanitize input, where key cryptographic information is stored. So-called "helping queries" can be used in order to find answers to these questions automatically. For example, a query that reveals the data access layer (DAL) methodology may help in the identification of SQL injection vulnerabilities without the need of the user to explicitly define the DAL methodology.
Fine Tuning Issues.

The SCA engine 22 (FIG. 2) assists the vulnerability discovery process using a source-sensitive wizard to develop queries. In addition to the basic information, each built-in query of the SCA engine 22 has conditions that determine whether the query should be executed. This wizard is source-code sensitive wizard, in that it asks relevant questions based to determine whether such conditions are satisfied for the particular source code. For example, if the application does not access the database, all relevant database questions can be omitted.

It will be appreciated by persons skilled in the art that the present invention is not limited to what has been particularly shown and described hereinabove. Rather, the scope of the present invention includes both combinations and sub-combinations of the various features described hereinabove, as well as variations and modifications thereof that are not in the prior art, which would occur to persons skilled in the art upon reading the foregoing description.

Computer Program Listings

---

Listing 1

```
    ......
    i = 5;
    ......
    i = 6;
    ......
```

---

Listing 2

```
1. class myClass
2. {
3.     public int x;
4. }
5. class Run
6. {
7.     void foo( )
8.     {
9.         int i,j;
10.        myClass a = new myClass( );
11.        myClass b = new myClass( );
12.        i = 1;
13.        j = 2;
14.        a.x = 3;
15.        b.x = 4;
16.    }
17. }
```

---

Listing 3

```
Class cs1
{
    Int i = 3;
    Int j = 5;
    Public cs1( )
    {
        Int a = 6;
    }
    Public cs1(int p)
    {
        Int a = p;
    }
}
```

---

Listing 4

```
Class cs1
{
    Int i,j;
    private MetaConstructor( )
    {
        i = 3;
        j = 5;
    }
    Public cs1( ):MetaConstructor( )
```

---

Listing 4 -continued

```
    {
        Int a = 6;
    }
    Public cs1(int p):MetaConstrcutor( )
    {
        Int a = p;
    }
}
```

---

Listing 5

```
Public class myClass
{
    Public int var1;
    Public int var2;
}
Public class mySecondClass
{
    Public void func(myClass ins)
    {
        Session["Hello"] = "Information";
    }
    Int var3;
}
```

---

Listing 6

```
DOM d = BuildDomFromFile (@"C: code.cs");
OODB db = Store(d);
db.Select
    ("Select CalledFunctionName, CallingFunctionName from
    MethodInvokes")
```

---

Listing 7

```
OODB db = OpenDB(@"C:\Project1.db");
db.Update ("Update Field
set Attributes = Private
where Attributes = Public");
DOM d = BuildDomFromDB(db);
d.WriteSelf(@"C:\output.cs");
```

---

Listing 8

```
1. int a = 3;
2. int b = 5;
3. b = a++;
4. Write(a)
```

---

Listing 9

```
1. int a = 3;
---------
3. b = a++;
4. Write(a)
```

Listing 10

1. int a = 3;
----------
3. a++;
4. Write(a)

Listing 11 a = "Select name from table where id = 3"
r = "Select rank from table where name = ' " + a + " ' "

Listing 12

```
For each (PageAccess pa in PagesAccess)
{
    Ifs[pa] = Conditions.ControlInfluencingOn(pa);
}
IntersectionIfs = Intersect(Ifs);
if (!CurrentPage.Contains(IntersectionIfs))
{
    _report_a_vulnerability_
}
```

The invention claimed is:

1. A computer-implemented method for evaluating a computer program, the method comprising:
receiving, into a memory of a computer, source code of the computer program to be analyzed, the source code including invocations of specified methods;
automatically analyzing the invocations in the source code in order to assign the specified methods, based on parameters of the specified methods, to different, first and second invocation types;
constructing, using a source code analyzer running on the computer, a control flow graph representing a flow of the computer program, while replacing the invocations with stubs of different, first and second stub types, corresponding respectively to the first and second invocation types, in the control flow graph when the source code of the specified methods is unavailable;
analyzing the control flow graph containing at least some of the stubs, in order to identify a security vulnerability in the source code; and
reporting the identified security vulnerability.

2. The method according to claim 1, and comprising, when the source code becomes available for a given method, replacing a corresponding stub with a single-method control flow graph.

3. The method according to claim 1, wherein automatically analyzing the invocations comprises identifying at least a first invocation that uses but does not update the parameters of a corresponding method as belonging to the first invocation type, and wherein replacing the invocations with the stubs comprises inserting in the control flow graph, in place of at least the first invocation, at least a first of the first stub type.

4. The method according to claim 3, automatically analyzing the invocations comprises identifying a second invocation for which the parameters influence a currently-active object in the computer program as belonging to the second invocation type, and replacing the second invocation with a second stub of the second stub type.

5. The method according to claim 4, wherein automatically analyzing the invocations comprises deciding whether to replace a given method invocation with the first or second stub type depending on a name of the invoked method.

6. A data processing system, comprising:
a memory, having program instructions stored therein;
an I/O facility; and
a processor accessing the memory to read the instructions, which cause the processor to receive, via the I/O facility, source code of a computer program to be analyzed, the source code including invocations of specified methods, to automatically analyze the invocations in the source code in order to assign the specified methods, based on parameters of the specified methods, to different, first and second invocation types, to construct, using a source code analyzer running on the processor, a control flow graph representing a flow of the computer program, while replacing the invocations with stubs of different, first and second stub types, corresponding respectively to the first and second invocation types, in the control flow graph when the source code of the specified methods is unavailable, to analyze the control flow graph containing at least some of the stubs, in order to identify a security vulnerability in the source code, and to report the identified security vulnerability.

7. The system according to claim 6, wherein the instructions cause the processor, when the source code becomes available for a given method, to replace a corresponding stub with a single-method control flow graph.

8. The system according to claim 6, wherein the instructions cause the processor to identify at least a first invocation that uses but does not update the parameters of a corresponding method as belonging to the first invocation type, and wherein the instructions cause the processor to insert in the control flow graph, in place of at least the first invocation, at least a first stub of the first stub type.

9. The system according to claim 8, wherein the instructions cause the processor to identify a second invocation for which the parameters influence a currently-active object in the computer program as belonging to the second invocation type, and to replace the second invocation with a second stub of the second stub type.

10. The system according to claim 9, wherein the instructions cause the processor to decide whether to replace a given method invocation with the first or second stub type depending on a name of the invoked method.

11. A computer software product, comprising a tangible, non-transitory computer-readable medium in which program instructions are stored, which instructions, when read by a computer, cause the computer to receive source code of a computer program to be analyzed, the source code including invocations of specified methods, to automatically analyze the invocations in the source code in order to assign the specified methods, based on parameters of the specified methods, to different, first and second invocation types, to construct, using a source code analyzer running on the computer, a control flow graph representing a flow of the computer program, while replacing the invocations with stubs of different, first and second stub types, corresponding respectively to the first and second invocation types, in the control flow graph when the source code of the specified methods is unavailable, to analyze the control flow graph containing at least some of the stubs, in order to identify a security vulnerability in the source code, and to report the identified security vulnerability.

12. The product according to claim 11, wherein the instructions cause the computer, when the source code becomes available for a given method, to replace a corresponding stub with a single-method control flow graph.

13. The product according to claim 11, wherein the instructions cause the computer to identify at least a first invocation that uses but does not update the parameters of a corresponding method as belonging to the first invocation type, and wherein the instructions cause the computer to insert in the control flow graph, in place of at least the first invocation, at least a first stub of the first stub type.

14. The product according to claim 13, wherein the instructions cause the computer to identify a second invocation for which the parameters influence a currently-active object in the computer program as belonging to the second invocation type, and to replace the second invocation with a second stub of the second stub type.

15. The product according to claim 14, wherein the instructions cause the computer to decide whether to replace a given method invocation with the first or second stub type depending on a name of the invoked method.

* * * * *